United States Patent
Bennett et al.

(10) Patent No.: US 8,964,013 B2
(45) Date of Patent: Feb. 24, 2015

(54) DISPLAY WITH ELASTIC LIGHT MANIPULATOR

(75) Inventors: James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 619 days.

(21) Appl. No.: 12/774,307

(22) Filed: May 5, 2010

(65) Prior Publication Data

US 2011/0157336 A1   Jun. 30, 2011

Related U.S. Application Data

(60) Provisional application No. 61/291,818, filed on Dec. 31, 2009, provisional application No. 61/303,119, filed on Feb. 10, 2010.

(51) Int. Cl.
*H04N 13/00* (2006.01)
*H04N 13/04* (2006.01)
(Continued)

(52) U.S. Cl.
CPC ............. *H04N 13/0497* (2013.01); *G06F 3/14* (2013.01); *G09G 3/003* (2013.01); *G09G 3/20* (2013.01);
(Continued)

(58) Field of Classification Search
CPC .......... H04N 13/0404; H04N 13/0409; H04N 13/0424; H04N 13/0497; H04N 13/0448
USPC .......................................... 348/53–56, 59, 51
See application file for complete search history.

(56) References Cited

U.S. PATENT DOCUMENTS

| 4,829,365 A | 5/1989 | Eichenlaub |
| 5,493,427 A | 2/1996 | Nomura et al. |

(Continued)

FOREIGN PATENT DOCUMENTS

| EP | 0833183 A1 | 4/1998 |
| EP | 1662808 A1 | 5/2006 |

(Continued)

OTHER PUBLICATIONS

Search Report received for European Patent application No. 10016055.5, mailed on Apr. 12, 2011, 3 pages.

(Continued)

*Primary Examiner* — Jamie Atala
*Assistant Examiner* — On S Mung
(74) *Attorney, Agent, or Firm* — Fiala & Weaver P.L.L.C.

(57) ABSTRACT

A display system is provided that enables three-dimensional images to be displayed. The display system includes an elastic light manipulator positioned proximate an image generator. The image generator includes a pixel array. The elastic light manipulator includes an elastic material and is mounted in a manner that allows for automated stretching thereof. For instance, the elastic light manipulator may be an elastic lenticular lens, an elastic parallax barrier, etc. Because the elastic light manipulator can be stretched, optical properties of the elastic light manipulator can be dynamically modified, thereby changing the manner in which light emanating from the pixel array is delivered to the eyes of viewer(s). This allows for adaptive accommodation of, for example, a changing viewer sweet spot. The elastic light manipulator may be automatically rolled up or otherwise automatically removed from in front of the image generator in order to facilitate switching between 2D and 3D views.

32 Claims, 11 Drawing Sheets

(51) Int. Cl.

| | | |
|---|---|---|
| *G06F 3/14* | (2006.01) | |
| *G09G 3/00* | (2006.01) | |
| *G09G 3/20* | (2006.01) | |
| *H04N 21/235* | (2011.01) | |
| *H04N 21/41* | (2011.01) | |
| *H04N 21/435* | (2011.01) | |
| *G03B 35/24* | (2006.01) | |
| *H04S 7/00* | (2006.01) | |
| *G09G 5/00* | (2006.01) | |
| *G09G 5/14* | (2006.01) | |

(52) U.S. Cl.
CPC ....... *H04N 13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01); *H04N 13/0411* (2013.01); *H04N 13/0447* (2013.01); *H04N 13/0454* (2013.01); *H04N 13/0456* (2013.01); *H04N 13/0468* (2013.01); *H04N 21/235* (2013.01); *H04N 21/4122* (2013.01); *H04N 21/435* (2013.01); *G03B 35/24* (2013.01); *H04N 13/0413* (2013.01); *H04S 7/303* (2013.01); *G09G 5/003* (2013.01); *G09G 5/14* (2013.01); *G09G 2300/023* (2013.01); *G09G 2320/028* (2013.01); *G09G 2370/04* (2013.01); *H04N 2013/0463* (2013.01); *H04N 2013/0465* (2013.01)

USPC .................... 348/59; 348/51; 348/54; 348/60

(56) References Cited

U.S. PATENT DOCUMENTS

| | | | |
|---|---|---|---|
| 5,615,046 A | 3/1997 | Gilchrist | |
| 5,855,425 A | 1/1999 | Hamagishi | |
| 5,945,965 A | 8/1999 | Inoguchi et al. | |
| 5,959,597 A | 9/1999 | Yamada et al. | |
| 5,969,850 A * | 10/1999 | Harrold et al. ................. 359/320 |
| 5,990,975 A | 11/1999 | Nan et al. | |
| 6,023,277 A | 2/2000 | Osaka et al. | |
| 6,049,424 A | 4/2000 | Hamagishi | |
| 6,094,216 A | 7/2000 | Taniguchi et al. | |
| 6,144,375 A | 11/2000 | Jain et al. | |
| 6,188,442 B1 | 2/2001 | Narayanaswami | |
| 6,285,368 B1 | 9/2001 | Sudo | |
| 6,697,687 B1 | 2/2004 | Kasahara et al. | |
| 6,710,920 B1 | 3/2004 | Mashitani et al. | |
| 6,909,555 B2 | 6/2005 | Wohlstadter | |
| 7,030,903 B2 | 4/2006 | Sudo | |
| 7,038,698 B1 | 5/2006 | Palm et al. | |
| 7,091,471 B2 | 8/2006 | Wenstrand et al. | |
| 7,123,213 B2 | 10/2006 | Yamazaki et al. | |
| 7,190,518 B1 | 3/2007 | Kleinberger et al. | |
| 7,359,105 B2 | 4/2008 | Jacobs et al. | |
| 7,440,193 B2 | 10/2008 | Gunasekaran et al. | |
| 7,511,774 B2 | 3/2009 | Lee et al. | |
| 7,626,644 B2 | 12/2009 | Shestak et al. | |
| 7,646,451 B2 | 1/2010 | Vogel et al. | |
| 7,692,859 B2 | 4/2010 | Redert et al. | |
| 7,885,079 B2 | 2/2011 | Chen et al. | |
| 7,911,442 B2 | 3/2011 | Wang et al. | |
| 7,924,456 B1 | 4/2011 | Kahn et al. | |
| 7,954,967 B2 | 6/2011 | Kashiwagi et al. | |
| 7,997,783 B2 | 8/2011 | Song et al. | |
| 8,040,952 B2 | 10/2011 | Park et al. | |
| 8,044,983 B2 | 10/2011 | Nonaka et al. | |
| 8,049,710 B2 | 11/2011 | Shestak et al. | |
| 8,072,411 B2 | 12/2011 | Chen et al. | |
| 8,139,024 B2 | 3/2012 | Daiku | |
| 8,154,686 B2 | 4/2012 | Mather et al. | |
| 8,154,799 B2 | 4/2012 | Kim et al. | |
| 8,174,564 B2 | 5/2012 | Kim et al. | |
| 8,183,788 B2 | 5/2012 | Ma | |
| 8,209,396 B1 | 6/2012 | Raman et al. | |
| 8,233,034 B2 | 7/2012 | Sharp et al. | |
| 8,284,119 B2 | 10/2012 | Kim et al. | |
| 8,310,527 B2 | 11/2012 | Ko et al. | |
| 8,334,933 B2 | 12/2012 | Tsukada et al. | |
| 8,363,928 B1 | 1/2013 | Sharp | |
| 8,368,745 B2 | 2/2013 | Nam et al. | |
| 8,384,774 B2 | 2/2013 | Gallagher | |
| 8,400,392 B2 | 3/2013 | Kimura et al. | |
| 8,411,746 B2 | 4/2013 | Chen et al. | |
| 8,438,601 B2 | 5/2013 | Putterman et al. | |
| 8,441,430 B2 | 5/2013 | Lee | |
| 8,466,869 B2 | 6/2013 | Kobayashi et al. | |
| 8,482,512 B2 | 7/2013 | Adachi et al. | |
| 8,487,863 B2 | 7/2013 | Park et al. | |
| 8,525,942 B2 | 9/2013 | Robinson et al. | |
| 8,587,642 B2 | 11/2013 | Shestak et al. | |
| 8,587,736 B2 | 11/2013 | Kang | |
| 8,605,136 B2 | 12/2013 | Yu et al. | |
| 8,687,042 B2 | 4/2014 | Karaoguz et al. | |
| 8,766,905 B2 | 7/2014 | Adachi | |
| 8,823,782 B2 | 9/2014 | Karaoguz et al. | |
| 8,854,531 B2 | 10/2014 | Karaoguz et al. | |
| 2002/0010798 A1 | 1/2002 | Ben-Shaul et al. | |
| 2002/0037037 A1 | 3/2002 | Van Der Schaar | |
| 2002/0167862 A1 | 11/2002 | Tomasi et al. | |
| 2002/0171666 A1 | 11/2002 | Endo et al. | |
| 2003/0012425 A1 | 1/2003 | Suzuki et al. | |
| 2003/0103165 A1 | 6/2003 | Bullinger et al. | |
| 2003/0137506 A1 | 7/2003 | Efran et al. | |
| 2003/0154261 A1 | 8/2003 | Doyle et al. | |
| 2003/0223499 A1 | 12/2003 | Routhier et al. | |
| 2004/0027452 A1 | 2/2004 | Yun et al. | |
| 2004/0036763 A1 | 2/2004 | Swift et al. | |
| 2004/0041747 A1 | 3/2004 | Uehara et al. | |
| 2004/0109093 A1 | 6/2004 | Small-Stryker | |
| 2004/0141237 A1 | 7/2004 | Wohlstadter | |
| 2004/0164292 A1 | 8/2004 | Tung et al. | |
| 2004/0239231 A1* | 12/2004 | Miyagawa et al. ........... 313/438 |
| 2004/0252187 A1 | 12/2004 | Alden | |
| 2005/0073472 A1 | 4/2005 | Kim et al. | |
| 2005/0128353 A1 | 6/2005 | Young et al. | |
| 2005/0237487 A1 | 10/2005 | Chang | |
| 2005/0248561 A1 | 11/2005 | Ito et al. | |
| 2005/0259147 A1 | 11/2005 | Nam et al. | |
| 2006/0050785 A1 | 3/2006 | Watanabe et al. | |
| 2006/0087556 A1 | 4/2006 | Era | |
| 2006/0109242 A1 | 5/2006 | Simpkins | |
| 2006/0139448 A1 | 6/2006 | Ha et al. | |
| 2006/0139490 A1 | 6/2006 | Fekkes et al. | |
| 2006/0244918 A1 | 11/2006 | Cossairt et al. | |
| 2006/0256136 A1 | 11/2006 | O'Donnell et al. | |
| 2006/0256302 A1 | 11/2006 | Hsu | |
| 2006/0271791 A1 | 11/2006 | Novack et al. | |
| 2007/0002041 A1 | 1/2007 | Kim et al. | |
| 2007/0008406 A1* | 1/2007 | Shestak et al. ................. 348/58 |
| 2007/0008620 A1 | 1/2007 | Shestak et al. | |
| 2007/0052807 A1 | 3/2007 | Zhou et al. | |
| 2007/0072674 A1 | 3/2007 | Ohta et al. | |
| 2007/0085814 A1 | 4/2007 | Ljzerman et al. | |
| 2007/0096125 A1 | 5/2007 | Vogel et al. | |
| 2007/0097103 A1 | 5/2007 | Yoshioka et al. | |
| 2007/0097208 A1 | 5/2007 | Takemoto et al. | |
| 2007/0139371 A1 | 6/2007 | Harsham et al. | |
| 2007/0146267 A1 | 6/2007 | Jang et al. | |
| 2007/0147827 A1 | 6/2007 | Sheynman et al. | |
| 2007/0153916 A1 | 7/2007 | Demircin et al. | |
| 2007/0162392 A1 | 7/2007 | McEnroe et al. | |
| 2007/0258140 A1 | 11/2007 | Shestak et al. | |
| 2007/0270218 A1 | 11/2007 | Yoshida et al. | |
| 2007/0296874 A1 | 12/2007 | Yoshimoto et al. | |
| 2008/0025390 A1 | 1/2008 | Shi et al. | |
| 2008/0037120 A1* | 2/2008 | Koo et al. ..................... 359/463 |
| 2008/0043096 A1 | 2/2008 | Vetro et al. | |
| 2008/0043644 A1 | 2/2008 | Barkley et al. | |
| 2008/0068329 A1 | 3/2008 | Shestak et al. | |
| 2008/0126557 A1 | 5/2008 | Motoyama et al. | |
| 2008/0133122 A1 | 6/2008 | Mashitani et al. | |
| 2008/0150853 A1 | 6/2008 | Peng et al. | |

(56) References Cited

U.S. PATENT DOCUMENTS

| | | |
|---|---|---|
| 2008/0165176 A1 | 7/2008 | Archer et al. |
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0204550 A1 | 8/2008 | De Zwart et al. |
| 2008/0246757 A1 | 10/2008 | Ito |
| 2008/0259233 A1* | 10/2008 | Krijn et al. ............ 349/15 |
| 2008/0273242 A1* | 11/2008 | Woodgate et al. ....... 359/495 |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ikeda et al. |
| 2010/0215343 A1 | 8/2010 | Ikeda et al. |
| 2010/0218231 A1 | 8/2010 | Frink et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0302461 A1 | 12/2010 | Lim et al. |
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |

FOREIGN PATENT DOCUMENTS

| | | |
|---|---|---|
| EP | 1816510 A1 | 8/2007 |
| EP | 1993294 A2 | 11/2008 |
| TW | 200938878 A | 9/2009 |
| WO | 2005/045488 A1 | 5/2005 |
| WO | 2007/024118 A1 | 3/2007 |
| WO | 2008126557 A1 | 10/2008 |
| WO | 2009031872 A2 | 3/2009 |
| WO | 2009098622 A2 | 8/2009 |

OTHER PUBLICATIONS

Search Report received for European Patent application No. 10015984.7, mailed on May 3, 2011, 3 pages.

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", retrieved on Aug. 16, 2012, 4 pages.

"How browsers work", retrieved from <http://taligarsiel.com/Projects/howbrowserswork1.htm> on Oct. 21, 2010, Oct. 21, 2010, 54 pages.

Shan, et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006, pp. 365-372.

Peterka, "Dynallax: Dynamic Parallax Barrier Autostereoscopic Display", Ph.D. Dissertation, University of Illinois at Chicago, (2007), 134 pages.

Yanagisawa, et al., "A Focus Distance Controlled 3DTV", Proc. SPIE 3012, Stereoscopic Displays and Virtual Reality Systems IV, May 15, 1997, pp. 256-261.

EPO Communication received for European Patent Application No. 10016055.5, dated Apr. 5, 2013, 6 pages.

Ko et al., "Facial Feature Tracking and Head Orientation-Based Gaze Tracking", Electronics and Telecommunications Research Institute (ETRI), 2000, 4 pages.

Ruddarraju et al., "Perceptual User Interfaces using Vision-Based Eye Tracking", ICMI, Nov. 5-7, 2003, 7 pages.

Office Action received for Chinese Patent Application No. 201010619646.3, mailed on Mar. 31, 2014, 7 pages of Chinese Office action.

(56) References Cited

OTHER PUBLICATIONS

Office Action received for Chinese Patent Application No. 201010619646.x, mailed on Mar. 5, 2014, 4 pages of Chinese Office action.
Office Action received for Taiwan Patent Application No. 099147124, mailed on Mar. 31, 2014, 8 pages.
Office Action received for Chinese Patent Application No. 201010619649.3, mailed on Oct. 11, 2014, 5 pages.
Yanaka, "Stereoscopic Display Technique for Web3D Images", SIGGRAPH 2009, New Orleans, Louisiana, Aug. 3-7, 2009, 1 page.
Fono et al.,"EyeWindows: Evaluation of Eye-Controlled Zooming Windows for Focus Selection", CHI 2005, Papers: Eyes on Interaction, Portland, Oregon, Apr. 2-7, 2005, pp. 151-160.
Kumar et al.,"Eye Point: Practical Pointing and Selection Using Gaze and Keyboard", CHI 2007, Apr. 28-May 3, 2007, 10 pages.
INTEL, "Displaying Stereoscopic 3D (S3D) with Intel HD Graphics Processors for Software Developers", Aug. 2011, pp. 1-10.
Liao, et al.,"The Design and Application of High-Resolution 3D Stereoscopic graphics Display on PC", Purdue University School of Science, 2000, 7 Pages.

* cited by examiner

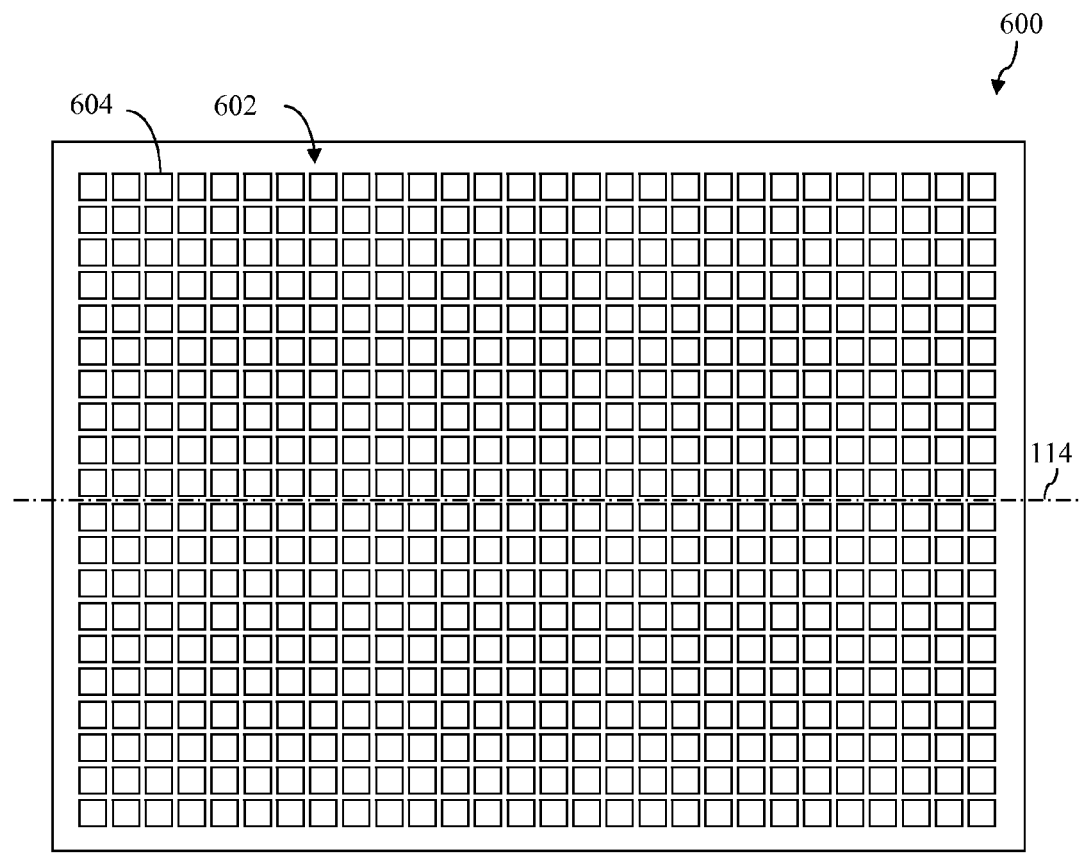
FIG. 6
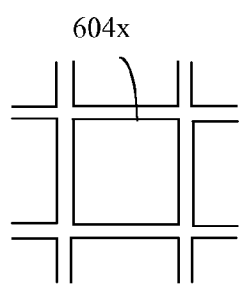 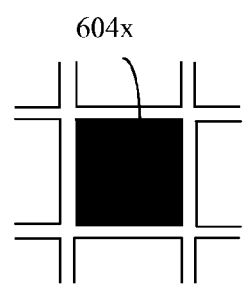
FIG. 7                FIG. 8

DISPLAY WITH ELASTIC LIGHT MANIPULATOR

CROSS-REFERENCE TO RELATED APPLICATIONS

This application claims the benefit of U.S. Provisional Application No. 61/291,818, filed Dec. 31, 2009, and U.S. Provisional Application No. 61/303,119, filed Feb. 10, 2010, the entireties of which are incorporated by reference herein.

BACKGROUND OF THE INVENTION

1. Field of the Invention

The present invention relates to techniques for displaying images.

2. Background Art

Images may be transmitted for display in various forms. For instance, television (TV) is a widely used telecommunication medium for transmitting and displaying images in monochromatic ("black and white") or color form. Conventionally, images are provided in analog form and are displayed by display devices in the form of two-dimensional images. More recently, images are being provided in digital form for display in two-dimensions on display devices having improved resolution. Even more recently, images capable of being displayed in three-dimensions are being provided.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses provide two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user, where the lenses of the LCD display glasses include corresponding displays that provide images of differing perspective to the user's eyes, to be perceived as three-dimensional.

Problems exist with such techniques for viewing three-dimensional images. For instance, persons that use such displays and systems to view three-dimensional images may suffer from headaches, eyestrain, and/or nausea after long exposure. Furthermore, some content, such as two-dimensional text, may be more difficult to read and interpret when displayed three-dimensionally. To address these problems, some manufacturers have created display devices that may be toggled between three-dimensional viewing and two-dimensional viewing. A display device may be switched to a three-dimensional mode for viewing of three-dimensional images, and may be switched to two-dimensional mode for viewing of two-dimensional images and/or to provide a respite from the viewing of three-dimensional images.

A lenticular lens is another example of a device that enables video to be displayed in three-dimensions. A lenticular lens includes an array of sub-lenses. The lenticular lens is placed proximate to an array of pixels so that a user's eyes each see a different set of the pixels to create a sense of depth. A disadvantage of lenticular lenses is that the viewer must be positioned in a well-defined location in order to experience the three-dimensional effect. If the viewer moves his/her eyes away from this "sweet spot," image flipping and/or exacerbation of the eyestrain, headaches and nausea that may be associated with prolonged three-dimensional image viewing may result. Conventional three-dimensional LCD displays that utilize lenticular lenses typically are capable of displaying only three-dimensional images.

BRIEF SUMMARY OF THE INVENTION

Methods, systems, and apparatuses are described for a display having an elastic light manipulator substantially as shown in and/or described herein in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 6 depicts a view of a surface of another example implementation of an elastic light manipulator shown in FIGS. 1 and 2 that includes a plurality of parallax barrier elements in accordance with an embodiment.

FIGS. 7 and 8 depict views of a parallax barrier element of an elastic light manipulator shown in FIG. 6 that is selected to be transparent and to be opaque, respectively, according to example embodiments.

Figure 1:
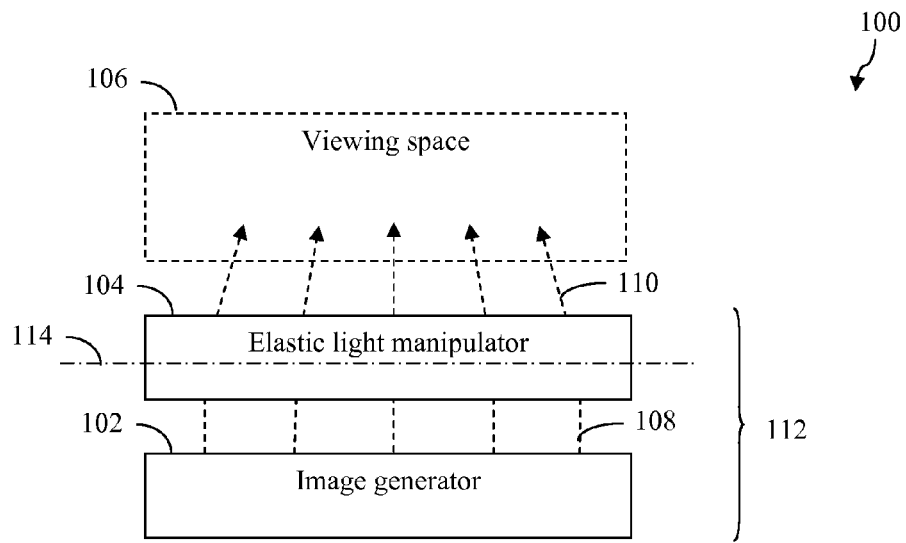
FIG. 1 shows a block diagram of a display system according to an example embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Example Embodiments

Example embodiments relate to display devices that include an elastic light manipulator positioned proximate an image generator. The image generator includes a pixel array. The elastic light manipulator includes an elastic material and is mounted in a manner that allows for automated stretching thereof. For instance, the elastic light manipulator may be an elastic lenticular lens, an elastic parallax barrier, etc. Because the elastic light manipulator can be stretched, optical properties of the elastic light manipulator can be dynamically modified, thereby changing the manner in which light emanating from the pixel array is delivered to the eyes of one or more viewers. This allows for adaptive accommodation of, for example, a changing viewer sweet spot. In some example embodiments, the elastic light manipulator may be automatically rolled up or otherwise automatically removed from in front of the image generator in order to facilitate switching between 2D and 3D views.

The following subsections describe a variety of example embodiments of the present invention. It will be apparent to persons skilled in the relevant art that various changes in form and detail can be made to the embodiments described herein without departing from the spirit and scope of the invention. Thus, the breadth and scope of the present invention should not be limited by any of the example embodiments described herein.

A. Example Display System and Method Embodiments

For instance, FIG. 1 shows a block diagram of a display system 100 according to an example embodiment. As shown in FIG. 1, system 100 includes a display device 112. Display device 112 enables the display of 2D and 3D images as described above. Display device 112 includes an image generator 102 and an elastic light manipulator 104. As shown in FIG. 1, image generator 102 emits video information in the form of light 108. Light 108 is received by elastic light manipulator 104, which manipulates light 108 to pass manipulated light 110. For instance, elastic light manipulator 104 refracts light 108 in accordance with optical properties of elastic light manipulator 104 that are dependent on an extent to which elastic light manipulator 104 is stretched along axis 114. Manipulated light 110 includes a plurality of video images formed from the video information included in light 108. For instance, manipulated light 110 may include one or more two-dimensional images and/or one or more three-dimensional images. Manipulated light 110 is received in a viewing space 106 proximate to display device 112. One or more users may be present in viewing space 106 to view the video images included in manipulated light 110.

Display device 112 may be configured in various ways. For instance, display device 112 may be a television display (e.g., an LCD (liquid crystal display) television, a plasma television, etc.), a computer monitor, or any other type of display device. Image generator 102 may be any suitable type of image generating device, including but not limited to an LCD screen, a plasma screen, an LED (light emitting device) screen, etc. Elastic light manipulator 104 may be any suitable type light manipulating device that is capable of being stretched to change its optical properties, including but not limited to an elastic lenticular lens, an elastic parallax barrier, or a combination thereof.

Although elastic light manipulators (e.g., elastic light manipulator 104) are described herein as being stretched along a single axis (e.g., axis 114) for purposes of illustration, the example embodiments are not limited in this respect. It will be recognized that the elastic light manipulators described herein may be stretched along multiple axes. For instance, elastic light manipulator 104 may be stretched along a second axis in addition to or in lieu of being stretched along axis 114. For example, the second axis may be perpendicular to axis 114.

Figure 2:
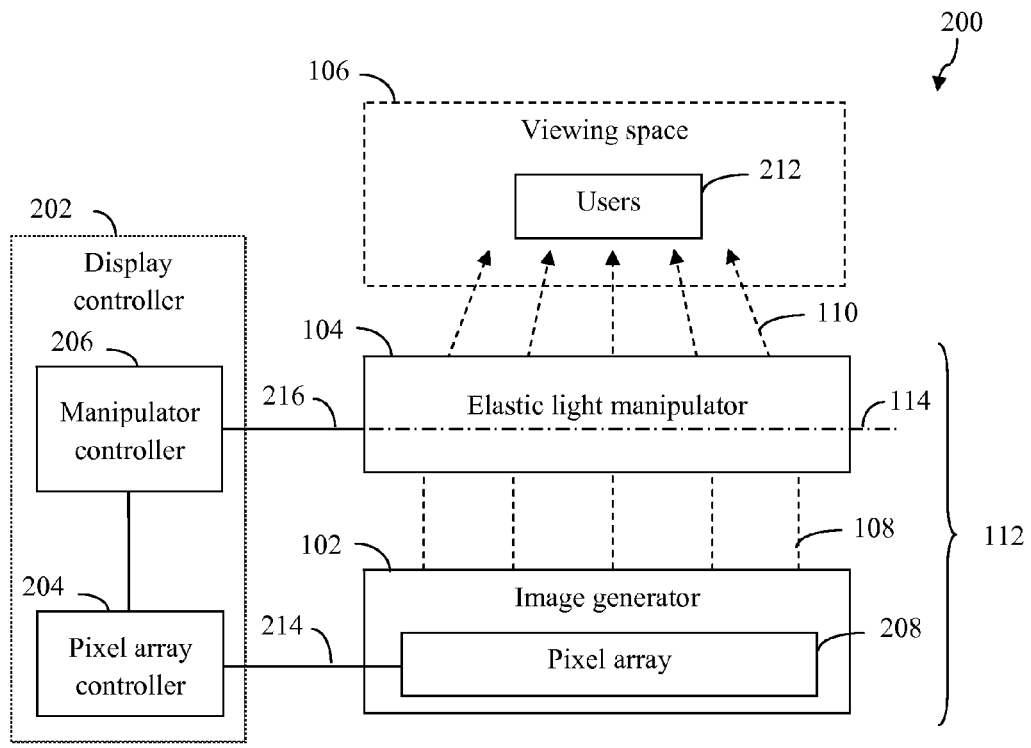
FIG. 2 shows a block diagram of an example implementation of a display system shown in FIG. 1 in accordance with an embodiment.

FIG. 2 shows a block diagram of a display system 200, which is an example of system 100 shown in FIG. 1, according to an embodiment. As shown in FIG. 2, system 200 includes a display device controller 202 and display device 112 (which includes image generator 102 and elastic light manipulator 104). As shown in FIG. 2, image generator 102 includes a pixel array 208. Furthermore, as shown in FIG. 2, display controller 202 includes a pixel array controller 204 and a manipulator controller 206. These features of system 200 are described as follows.

Pixel array 208 includes a two-dimensional array of pixels (e.g., arranged in a grid). The pixels of pixel array 208 may each emit light included in light 108. Each pixel may be a separately addressable light source (e.g., a pixel of a plasma, LCD, or LED display) and/or may include a filter that filters light received from a separate or included light source. Each pixel of pixel array 208 may be individually controllable to vary color and intensity. In an embodiment, each pixel of pixel array 208 may include a plurality of sub-pixels that correspond to separate color channels, such as a trio of red, green, and blue sub-pixels that is included in each pixel.

Figure 3:
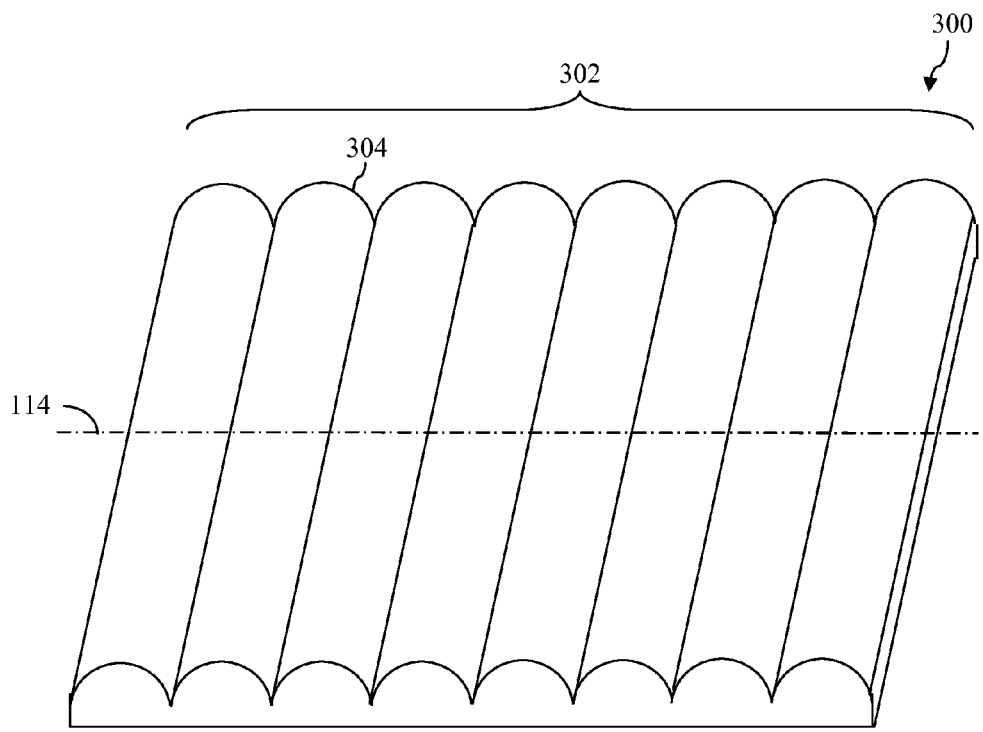
FIG. 3 depicts an example implementation of an elastic light manipulator shown in FIGS. 1 and 2 that includes an array of elastic sub-lenses in accordance with an embodiment.

Elastic light manipulator 104 is positioned proximate to a surface of pixel array 208. Elastic light manipulator 104 is configured to be stretchable along axis 114. For example, FIG. 3 shows an elastic light manipulator 300 that is implemented as an elastic lenticular lens in accordance with an embodiment. Elastic light manipulator 300 is an example of elastic light manipulator 104 of FIGS. 1 and 2. As shown in FIG. 3, elastic light manipulator 300 includes a sub-lens array 302. Sub-lens array 302 includes a plurality of elastic sub-lenses 304 arranged in a two-dimensional array (e.g., arranged side-by-side in a row). Each sub-lens 304 is shown in FIG. 3 as cylindrical in shape and having a substantially semi-circular cross-section, but in other embodiments may have other shapes. In FIG. 3, sub-lens array 302 is shown to include eight sub-lenses for illustrative purposes and is not intended to be limiting. For instance, sub-lens array 302 may include any number (e.g., hundreds, thousands, etc.) of sub-lenses 304.

Figure 4:
FIGS. 4 and 5 depict cross-sectional views of an elastic light manipulator shown in FIG. 3 in a non-stretched state and in a stretched state, respectively, according to example embodiments.
Figure 5:
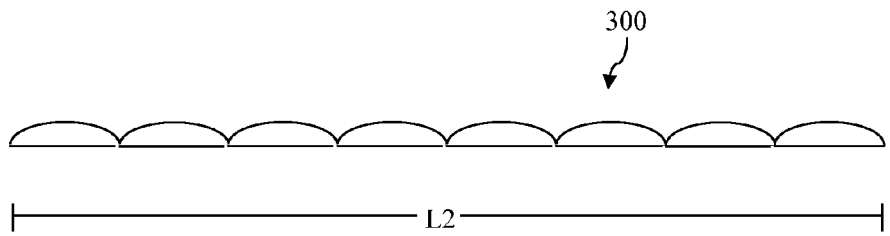

Elastic light manipulator 300 is configured to be stretchable along axis 114. For instance, FIG. 4 depicts a cross-sectional view of elastic light manipulator 300 in a non-stretched state, and FIG. 5 depicts a cross-sectional view of elastic light manipulator 300 in a stretched state, according to example embodiments. When elastic light manipulator 300 is in a non-stretched state, as shown in FIG. 4, elastic light manipulator 300 has a first length L1. When elastic light manipulator 300 is in a stretched state, as shown in FIG. 5, elastic light manipulator 300 has a second length L2 that is greater than L1. By stretching elastic light manipulator 300, optical properties of sub-lenses 304 are changed. For example, the second length L2 may be selectable to achieve desired optical properties of sub-lenses 304. In accordance with this example, the second length L2 may be selectable to accommodate a change in a number of users 212 and/or to accommodate movement of users 212, so that users 212 are able to perceive images that are intended for them. Accordingly, light 108 received at elastic light manipulator 300 is manipulated to generate manipulated light 110.

In another example, FIG. 6 shows an elastic light manipulator 600 that is implemented as an elastic parallax barrier in accordance with an embodiment. Elastic light manipulator 600 is another example of elastic light manipulator 104 of FIGS. 1 and 2. As shown in FIG. 6, elastic light manipulator 600 includes a blocking region array 602. Blocking region array 602 includes a plurality of blocking regions 604 arranged in a two-dimensional array (e.g., arranged in a grid). Each blocking region 604 is shown in FIG. 6 as rectangular (e.g., square) in shape, but in other embodiments may have other shapes. Blocking region array 602 may include any number of blocking regions 604. For instance, in FIG. 6, blocking region array 602 includes twenty-eight blocking region 604 along an x-axis and includes twenty blocking regions 604 along a y-axis, for a total number of 560 blocking regions 604. However, these dimensions of blocking region array 602 and the total number of blocking regions 604 for blocking region array 602 shown in FIG. 6 are provided for illustrative purposes, and are not intended to be limiting. Blocking region array 602 may include any number of blocking regions 604, and may have any number of blocking regions 604 along the x- and y-axes, including hundreds or thousands of blocking regions 604 along each of the x- and y-axes.

In addition to being stretchable, each blocking region 604 of blocking region array 602 is selectable to be opaque or transparent. For instance, FIG. 7 shows a blocking region 604x that is selected to be transparent, and FIG. 8 shows blocking region 604x when selected to be opaque, according to example embodiments. When blocking region 604x is selected to be transparent, light 108 from pixel array 208 may pass through blocking region 604x (e.g., to viewing space 106). When blocking region 604x is selected to be opaque, light 108 from pixel array 208 is blocked from passing through blocking region 604x. By selecting some of blocking regions 604 of blocking region array 602 to be transparent, and some of blocking regions 604 of blocking region array 602 to be opaque, light 108 received at blocking region array 602 is filtered to generate manipulated light 110.

Display controller 202 is configured to stretch elastic light manipulator 104 and to generate control signals to enable display device 112 to display two-dimensional and three-dimensional images to users 212 in viewing space 106. For example, pixel array controller 204 is configured to generate a control signal 214 that is received by pixel array 208. Control signal 214 may include one or more control signals used to cause pixels of pixel array 208 to emit light 108. Manipulator controller 206 is configured to provide a tensile stress along axis 114 to stretch elastic light manipulator 104. Stretching elastic light manipulator 104 causes the optical properties of elastic light manipulator 104 to change, so that elastic light manipulator 104 manipulates light 108 in accordance with the changed optical properties to generate manipulated light 110 that includes one or more two-dimensional and/or three-dimensional images that may be viewed by users 212 in viewing space 106.

For example, control signal 214 may control multiple sets of pixels of pixel array 208 to each emit light representative of a respective image, to provide a plurality of images. Manipulator controller 206 may stretch elastic light manipulator 104 to manipulate the light received from pixel array 208 corresponding to the provided images such that one or more of the images are received at one or more of users 212 in two-dimensional form. Furthermore, manipulator controller 206 may stretch elastic light manipulator 104 to manipulate the light received from pixel array 208 corresponding to at least one pair of the provided images such that the image pair is received at one or more of the users to be perceived as a three-dimensional image.

Manipulator controller 206 may be further configured to perform any of a variety of other operations with respect to elastic light manipulator 104, though the example embodiments are not limited in this respect. For example, manipulator controller 206 may be configured to change a curvature of elastic light manipulator 104 and/or an angle at which elastic light manipulator 104 is mounted with respect to pixel array 208. Such changes may be performed to accommodate a moving user based on a location of the user's head, for instance. In addition or alternatively, pixel array controller 204 may be configured to change (e.g., rearrange) pixels of pixel array 208 to accommodate the moving user.

In another example, manipulator controller 206 may be configured to retract elastic light manipulator 104, such that elastic light manipulator 104 (or a portion thereof) is removed from a position that is between pixel array 208 and users 212. For instance, retracting elastic light manipulator 104 may provide an unfiltered view of some or all of the pixels in pixel array 208. Accordingly, retracting elastic light manipulator 104 may enable one or more of the users to view a two-dimensional image that is generated by pixels of pixel array 208 that are not covered by elastic light manipulator 104, even if elastic light manipulator 104 is configured to provide a three-dimensional image with respect to other pixels of pixel array 208.

Manipulator controller 206 may be further configured to generate a control signal 216 that is received by elastic light manipulator 104, though the scope of the example embodiments is not limited in this respect. For example, in embodiments in which elastic light manipulator 104 includes an elastic parallax barrier (e.g., elastic light manipulator 600), control signal 216 may include one or more control signals used to cause blocking regions 604 of blocking region array 602 to be transparent or opaque to filter light 108 to facilitate the generation of manipulated light 110 that includes one or more two-dimensional and/or three-dimensional images that may be viewed by users 212 in viewing space 106.

In accordance with this example, control signal 216 may control blocking regions 604 of blocking region array 602 to filter the light received from pixel array 208 corresponding to the provided images such that one or more of the images are received at one or more of users 212 in two-dimensional form. For instance, control signal 216 may select one or more sections of blocking regions 604 of blocking region array 602 to be transparent, to transmit one or more corresponding two-dimensional images to users 212. Furthermore, control signal 216 may control blocking regions 604 of blocking region array 602 to filter the light received from pixel array 208 corresponding to at least one pair of the provided images such that the image pair is received at one or more of the users to be perceived as a three-dimensional image. For example, control signal 216 may select parallel strips of blocking regions 604 of blocking region array 602 to be transparent to form a three-dimensional image to be perceived by one or more of users 212.

In further accordance with this example, manipulator controller 206 may generate control signal 216 to form any number of parallel strips of blocking regions 604 of blocking region array 602 to be transparent, to modify the number of parallel strips of blocking regions 604 of blocking region array 602 that are transparent, to select a width and/or a length (in blocking regions 604) of one or more strips of blocking regions 604 of blocking region array 602 that are transparent, to modify the width and/or length, to select and/or modify an orientation of one or more strips of blocking regions 604 of blocking region array 602 that are transparent, to select one or more areas of blocking region array 602 to include all transparent or all opaque blocking regions 604, etc.

Figure 9:
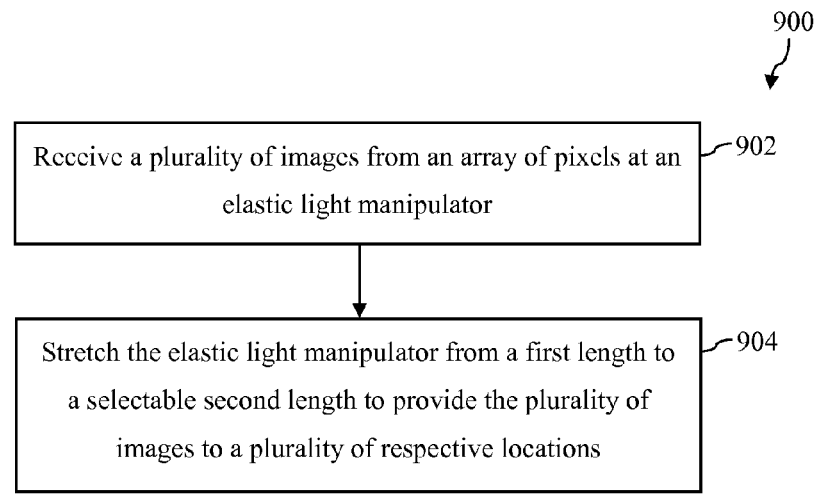
FIG. 9 depicts a flowchart of a method for generating two-dimensional and/or three-dimensional images in accordance with an example embodiment.
Figure 10:
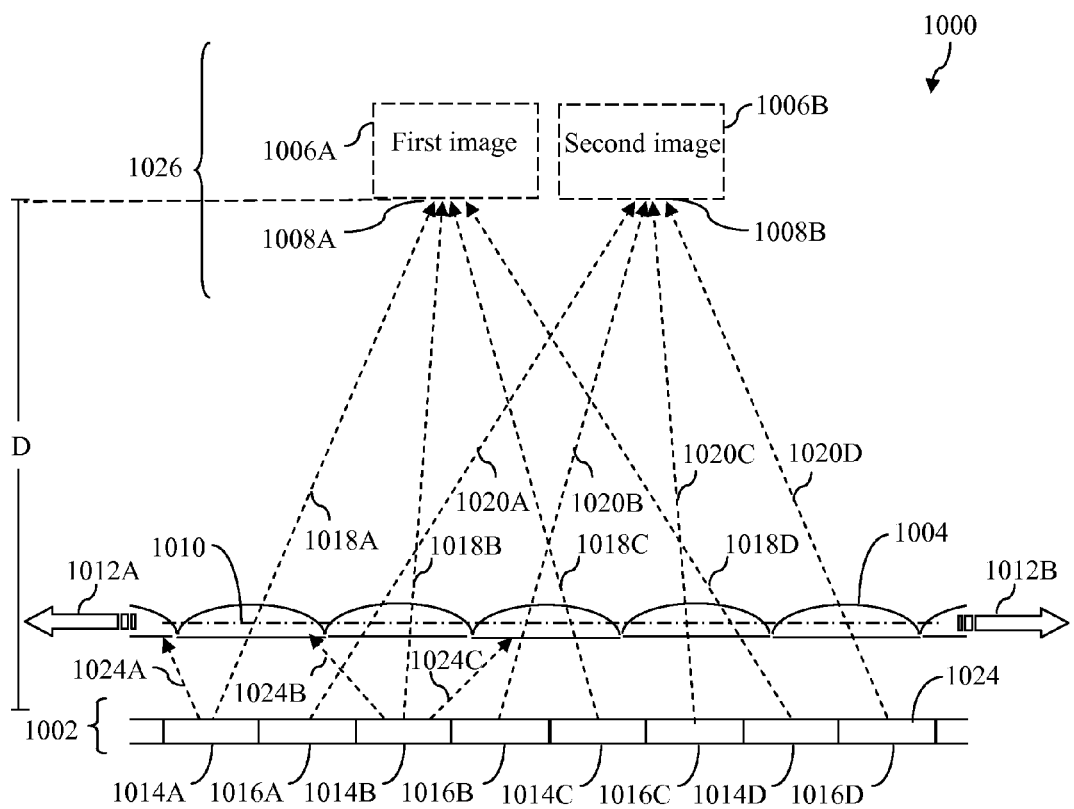
FIG. 10 shows a cross-sectional view of an example implementation of a display system shown in FIG. 2 according to an embodiment.

Two-dimensional and three-dimensional images may be generated by system 200 in various ways, in embodiments. For instance, FIG. 9 depicts a flowchart 900 of a method for generating two-dimensional and/or three-dimensional images in accordance with an example embodiment. Flowchart 900 may be performed by system 200 in FIG. 2, for example. Flowchart 900 is described with respect to FIG. 10, which shows a cross-sectional view of a display system 1000. Display system 1000 is an example embodiment of system 200 shown in FIG. 2. As shown in FIG. 10, system 1000 includes a pixel array 1002 and an elastic light manipulator 1004. Further structural and operational embodiments will be apparent to persons skilled in the relevant art(s) based on the discussion regarding flowchart 900. Flowchart 900 is described as follows.

Flowchart 900 begins with step 902. In step 902, a plurality of images is received from an array of pixels at an elastic light manipulator. For example, as shown in FIG. 10, pixel array 1002 includes a plurality of pixels 1014A-1014D and 1016A-1016D. Pixels 1014 alternate with pixels 1016, such that pixels 1014A-1014d and 1016A-1016D are arranged in series in the order of pixels 1014A, 1016A, 1014B, 1016B, 1014C, 1016C, 1014D, and 1016D. Further pixels may be included in pixel array 1002 that are not visible in FIG. 10. Each of pixels 1014A-1014D and 1016A-1016D generates light, which emanates from display surface 1024 of pixel array 1002 generally in all directions of a hemispherical pattern (e.g., generally upward in FIG. 10) towards elastic light manipulator 1004. Some example indications of light emanating from pixels 1014A-1014D and 1016A-1016D are shown in FIG. 10 (as dotted lines), including light 1024A and light 1018A emanating from pixel 1014A, light 1024B, light 1018B, and light 1024C emanating from pixel 1014B, etc. Elastic light manipulator 1004 is shown to be implemented as an elastic lenticular lens for illustrative purposes and is not intended to be limiting. Elastic light manipulator 1004 may be any suitable type of elastic light manipulator.

In step 904, the elastic light manipulator is stretched from a first length to a selectable second length to provide the plurality of images to a plurality of respective locations. For example, as shown in FIG. 10, a tensile stress (indicated by arrows 1012A and 1012B) may be applied to elastic light manipulator 1004 along axis 1010 to stretch elastic light manipulator 1004 from the first length (e.g., L1 in FIG. 4) to the second length (e.g., L2 in FIG. 5). As shown in FIG. 10, light emanating from pixel array 1002 is manipulated by elastic light manipulator 1004 to form a plurality of images in a viewing space 1026, including a first image 1006A at a first location 1008A and a second image 1006B at a second location 1008B. As described above, pixel array 1002 includes a first set of pixels 1014A-1014D and a second set of pixels 1016A-1016D. Pixels 1014A-1014D correspond to first image 1006A and pixels 1016A-1016D correspond to second image 1006B. Due to the spacing of pixels 1014A-1014D and 1016A-1016D in pixel array 1002, and the geometry of elastic light manipulator 1004, first and second images 1006A and 1006B are formed at locations 1008A and 1008B, respectively, which are positioned at a distance D from pixel array 1002. As shown in FIG. 10, light 1018A-1018D from the first set of pixels 1014A-1014D forms first image 1006A at first location 1008A, and light 1020A-1020D from the second set of pixels 1016A-1016D forms second image 1006B at second location 1008B, based on the optical properties of elastic light manipulator 1004.

For example, elastic light manipulator 1004 may refract a first portion of the light emanating from pixel array 1002 that corresponds to first image 1006A such that first image 1006A is perceived at first location 1008A but not at second location 1008B. For instance, the first portion of the light is shown in FIG. 10 to include light 1018A-1018D and light 1024A-1024C. Elastic light manipulator 1004 may refract light 1018A-1018D toward location 1008A and may refract light 1024A-1024C toward locations other than first location 1008A and second location 1008B. Elastic light manipulator 1004 may refract a second portion of the light emanating from pixel array 1002 that corresponds to second image 1006B such that second image 1006B is perceived at second location 1008B but not at first location 1008A. Although not shown in FIG. 10, instances of first and second images 1006A and 1006B may repeat in viewing space 1026.

Figure 11:
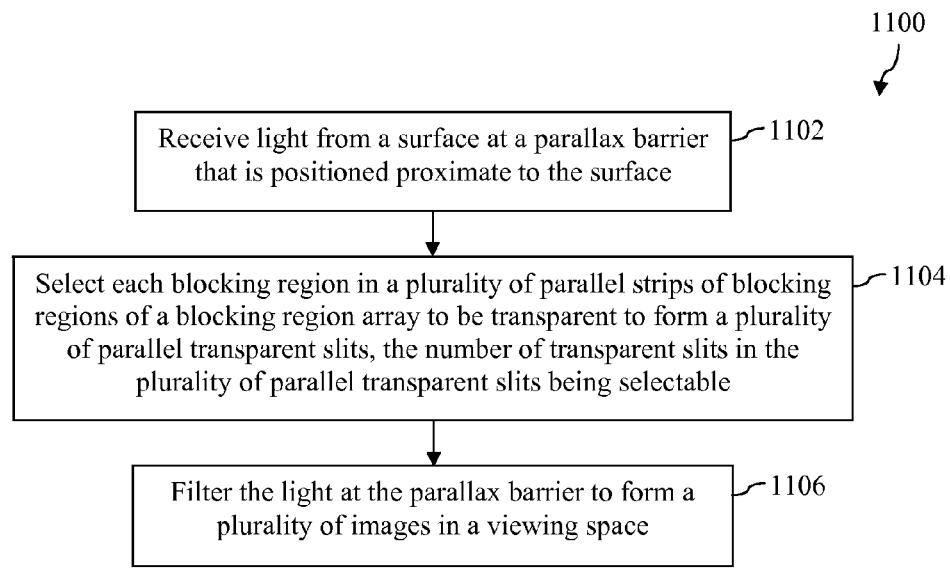
FIG. 11 depicts a flowchart of another method for generating two-dimensional and/or three-dimensional images in accordance with an example embodiment.
Figure 12:
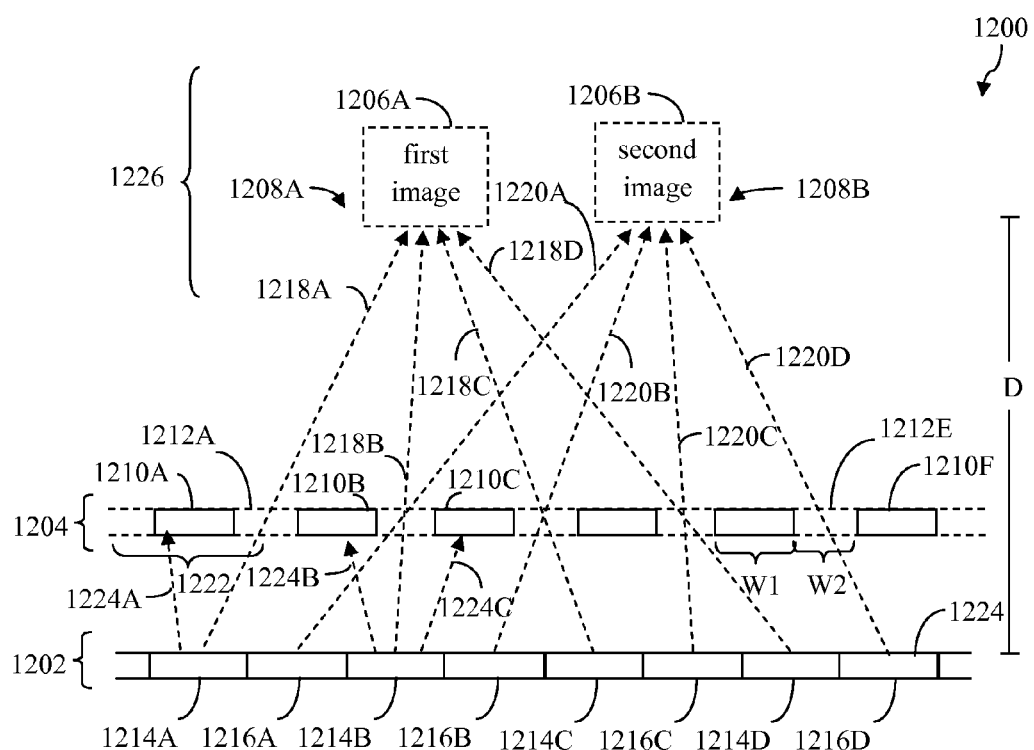
FIG. 12 depicts a cross-sectional view of another example implementation of a display system shown in FIG. 2 according to an embodiment.

B. Additional Information Regarding Example Elastic Parallax Barrier Embodiments FIG. 11 depicts a flowchart 1100 of another method for generating two-dimensional and/or three-dimensional images in accordance with an example embodiment. Flowchart 1100 may be performed by system 200 in FIG. 2, for example. Flowchart 1100 is described with respect to FIG. 12, which shows a cross-sectional view of a display system 1200. Display system 1200 is another example embodiment of system 200 shown in FIG. 2. As shown in FIG. 12, system 1200 includes a pixel array 1202 and a blocking region array 1204. Further structural and operational embodiments will be apparent to persons skilled in the relevant art(s) based on the discussion regarding flowchart 1100. Flowchart 1100 is described as follows.

Flowchart 1100 begins with step 1102. In step 1102, light is received from a surface at an elastic parallax barrier that is positioned proximate to the surface. For example, as shown in FIG. 12, pixel array 1202 includes a plurality of pixels 1214a-1214d and 1216a-1216d. Pixels 1214 alternate with pixels 1216, such that pixels 1214a-1214d and 1216a-1216d are arranged in series in the order of pixels 1214a, 1216a, 1214b, 1216b, 1214c, 1216c, 1214d, and 1216d. Further pixels may be included in pixel array 1202 that are not visible in FIG. 12. Each of pixels 1214a-1214d and 1216a-1216d generates light, which emanates from display surface 1224 of pixel array 1202 generally in all directions of a hemispherical pattern (e.g., generally upward in FIG. 12) towards blocking region array 1204. Some example indications of light emanating from pixels 1214a-1214d and 1216a-1216d are shown in FIG. 12 (as dotted lines), including light 1224a and light 1218a emanating from pixel 1214a, light 1224b, light 1218b, and light 1224c emanating from pixel 1214b, etc.

In step 1104, each blocking region in a plurality of parallel strips of blocking regions of the blocking region array is selected to be transparent to form a plurality of parallel transparent slits, the number of transparent slits in the plurality of parallel transparent slits being selectable. For example, as shown in FIG. 12, blocking region array 1204 includes a plurality of blocking regions that are each either transparent or opaque. For example, blocking regions that are opaque are indicated as blocking regions 1210a-1210f, and blocking regions that are transparent are indicated as blocking regions 1212a-1212e. Further blocking regions may be included in blocking region array 1204 that are not visible in FIG. 12. Each of blocking regions 1210a-1210f and 1212a-1212e may include one or more blocking regions. Blocking regions 1210 alternate with blocking regions 1212, such that blocking regions 1210a-1210f and 1212a-1212e are arranged in series in the order of blocking regions 1210a, 1212a, 1210b, 1212b, 1210c, 1212c, 1210d, 1212d, 1210e, 1212e, and 1210f. In this manner, opaque blocking regions 1210 are alternated with transparent blocking regions 1212 to form a plurality of parallel transparent slits in blocking region array 1204.

Figure 13:
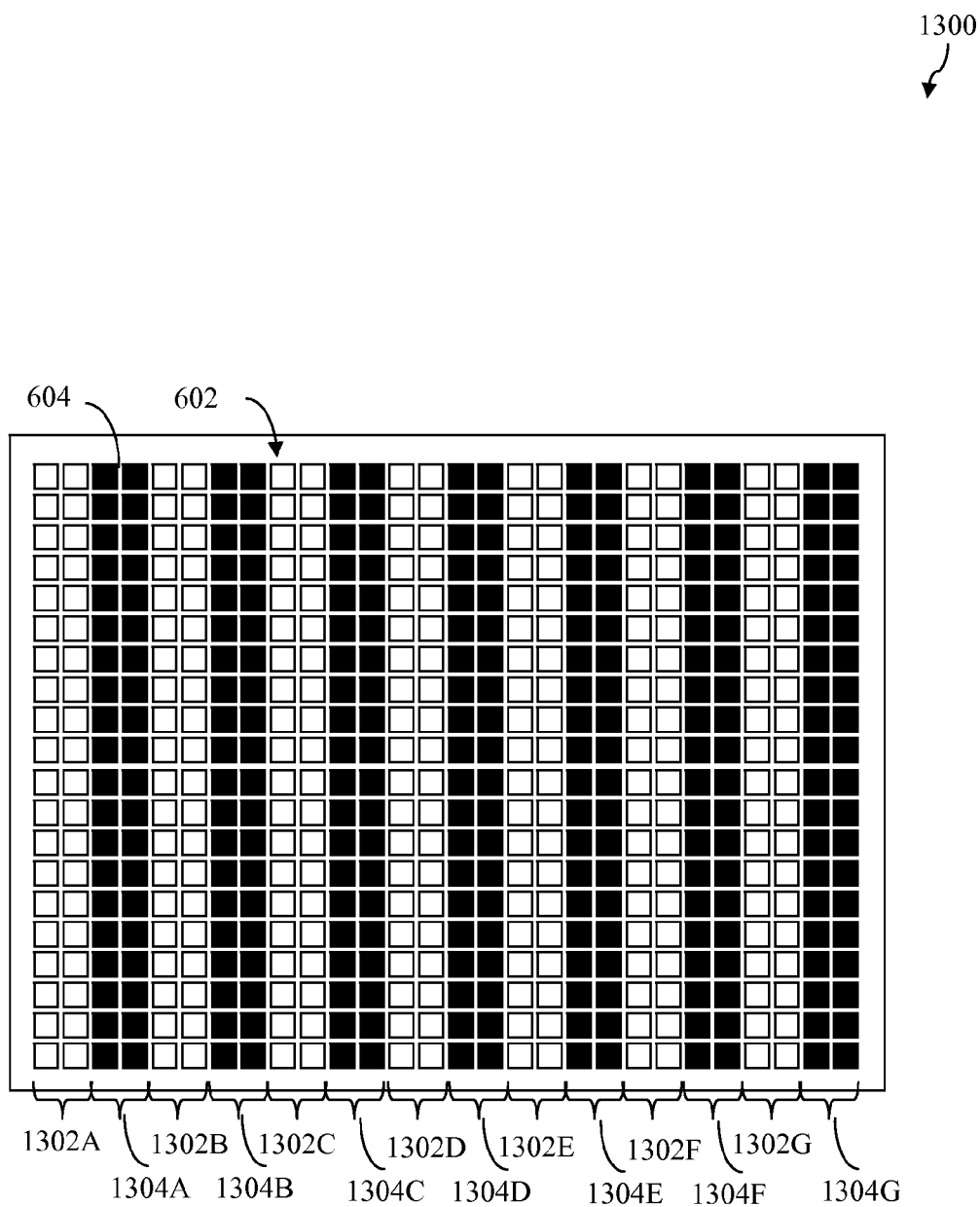
FIG. 13 depicts a view of the elastic light manipulator of FIG. 6 with transparent slits according to an example embodiment.

For instance, FIG. 13 depicts a view of elastic light manipulator 600 of FIG. 6, which is implemented as an elastic parallax barrier, according to an example embodiment. As shown in FIG. 13, elastic light manipulator 600 includes blocking region array 602, which includes a plurality of blocking regions 604 arranged in a two-dimensional array. Furthermore, as shown in FIG. 13, blocking region array 602 includes a plurality of parallel strips of blocking regions 604 that are selected to be transparent to form a plurality of parallel transparent strips 1302A-1302G. As shown in FIG. 13, parallel transparent strips 1302A-1302G (transparent slits) are alternated with parallel opaque strips 1304A-1304G of blocking regions 304 that are selected to be opaque. In the example of FIG. 13, transparent strips 1302A-1302G and opaque strips 1304A-1304G each have a width (along the x-dimension) of two blocking regions 304, and have lengths that extend along the entire y-dimension (twenty blocking regions 304) of blocking region array 304, although in other embodiments, may have alternative dimensions.

In step 1106, the light is filtered at the parallax barrier to form a plurality of images in a viewing space. For example, as shown in FIG. 12, light emanating from pixel array 1202 is filtered by blocking region array 1204 to form a plurality of images in a viewing space 1226, including a first image 1206A at a first location 1208A and a second image 1206B at a second location 1208B. A portion of the light emanating from pixel array 1202 is blocked by opaque blocking regions 1210, while another portion of the light emanating from pixel array 1202 passes through transparent blocking regions 1212, to be filtered by blocking region array 1204. For instance, light 1224A from pixel 1214A is blocked by opaque blocking region 1210A, and light 1224B and light 1224C from pixel 1214B are blocked by opaque blocking regions 1210B and 1210C, respectively. In contrast, light 1218A from pixel 1214A is passed by transparent blocking region 1212A and light 1218B from pixel 1214B is passed by transparent blocking region 1212B.

By forming parallel transparent slits in a blocking region array, light from a pixel array can be filtered to form multiple images in a viewing space. For instance, system 1200 shown in FIG. 12 is configured to form first and second images 1206A and 1206B at locations 1208A and 1208B, respectively. Although not shown in FIG. 12, instances of first and second images 1206A and 1206B may repeat in viewing space 1226. As described above, pixel array 1202 includes a first set of pixels 1214A-1214D and a second set of pixels 1216A-1216D. Pixels 1214A-1214D correspond to first image 1206A and pixels 1216A-1216D correspond to second image 1206B. Due to the spacing of pixels 1214A-1214D and 1216A-1216D in pixel array 1202, and the geometry of transparent blocking regions 1212 in blocking region array 1204, first and second images 1206A and 1206A are formed at locations 1208A and 1208B, respectively, which are positioned at a distance D from pixel array 1202.

For example, the geometry of transparent blocking regions 1212 may be based on an extent to which blocking region array 1204 is stretched. In accordance with this example, a greater extent of stretching may result in opaque blocking regions 1210 having a greater length W1 and/or transparent blocking regions 1212 having a greater length W2. Accordingly, the greater extent of stretching may result in a greater slit spacing 1222 (center-to-center). Slit spacing 1222 is described in greater detail in the following discussion. A lesser extent of stretching may result in opaque blocking regions 1210 having a lesser length W1 and/or transparent blocking regions 1212 having a lesser length W2. Accordingly, the lesser extent of stretching may result in a narrower slit spacing 1222.

As shown in FIG. 12, light 1218A-1218D from the first set of pixels 1214A-1214D forms first image 1206A at first location 1208A and light 1220A-1220D from the second set of pixels 1216A-1216D forms first image 1206A at second location 1208B due to the filtering of the transparent slits (corresponding to transparent blocking regions 1212A-1212E) in blocking region array 1204.

FIG. 12 shows a slit spacing 1222 (center-to-center) of transparent blocking regions 1212 in blocking region array 1204. Spacing 1222 may be determined to select locations for parallel transparent slits to be formed in blocking region array 1204 for a particular image distance 1228 at which images are desired to be formed (for viewing by users). If a spacing of pixels 1214A-1214D and distance 1228 are known, the spacing 1222 between adjacent parallel transparent slits in blocking region array 1204 may be selected. For instance, manipulator controller 206 (of FIG. 2) may be configured to calculate spacing 1222 for particular spacing of pixels 1214A-1214D and a desired distance D for images 1206 to be formed.

C. Example Multi-Three-Dimensional Image Embodiments

Figure 14:
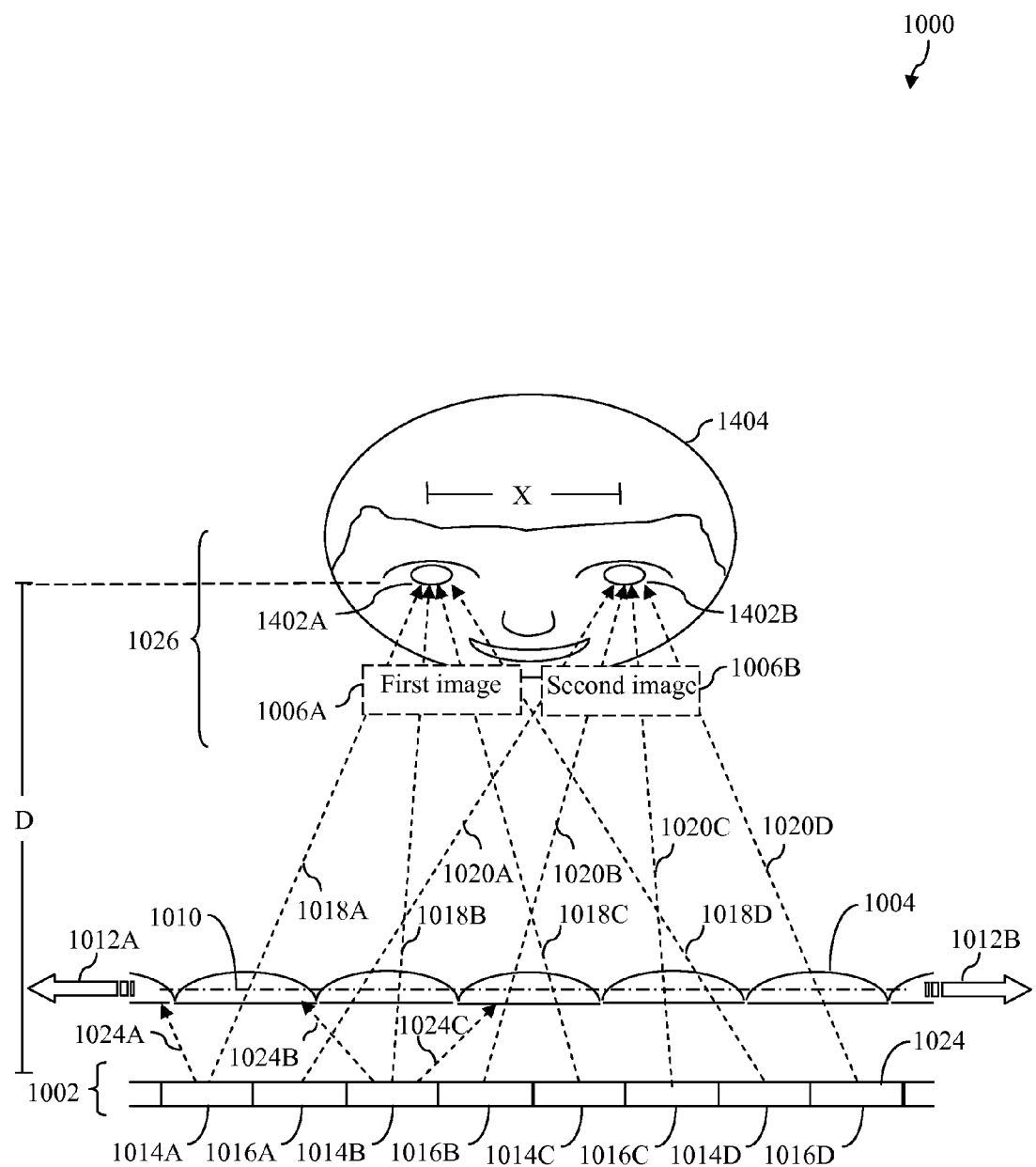
FIG. 14 shows the display system of FIG. 10 providing a three-dimensional image to a user according to an example embodiment.

In an embodiment, a display system (e.g., display system 1000 of FIG. 10 or display system 1200 of FIG. 12) may be configured to generate three-dimensional images for viewing by users in a viewing space. The following discussion is provided with reference to display system 1000 as shown in FIG. 14 for illustrative purposes and is not intended to be limiting. Persons skilled in the relevant art(s) will recognize that the techniques described herein for providing three-dimensional and multi-three-dimensional images are applicable to any suitable display system.

Referring to FIG. 14, first and second images 1006A and 1006B may be configured to be perceived by a user as a three-dimensional image. For example, light from the array of pixels may be manipulated to form a first image corresponding to the first set of pixels at a right eye location and to form a second image corresponding to the second set of pixels at a left eye location. As shown in FIG. 14, a user 1402 receives first image 1006A at a first eye location 1402A and second image 1006B at a second eye location 1402B according to an example embodiment. First and second images 1006A and 1006B may be generated by first set of pixels 1014A-1014D and second set of pixels 1016A-1016D, respectively, as images that are slightly different from each other. Images 1006A and 1006B are combined in the visual center of the brain of user 1404 to be perceived as a three-dimensional image.

In such an embodiment, first and second images 1006A and 1006B may be formed by display system 1000 such that their centers are spaced apart a width of a user's pupils (e.g., an "interocular distance", labeled as "X" in FIG. 14). For example, the spacing of first and second images 1006A and 1006B may be approximately 65 mm (or other suitable spacing) to generally be equivalent to interocular distance X.

Figure 15:
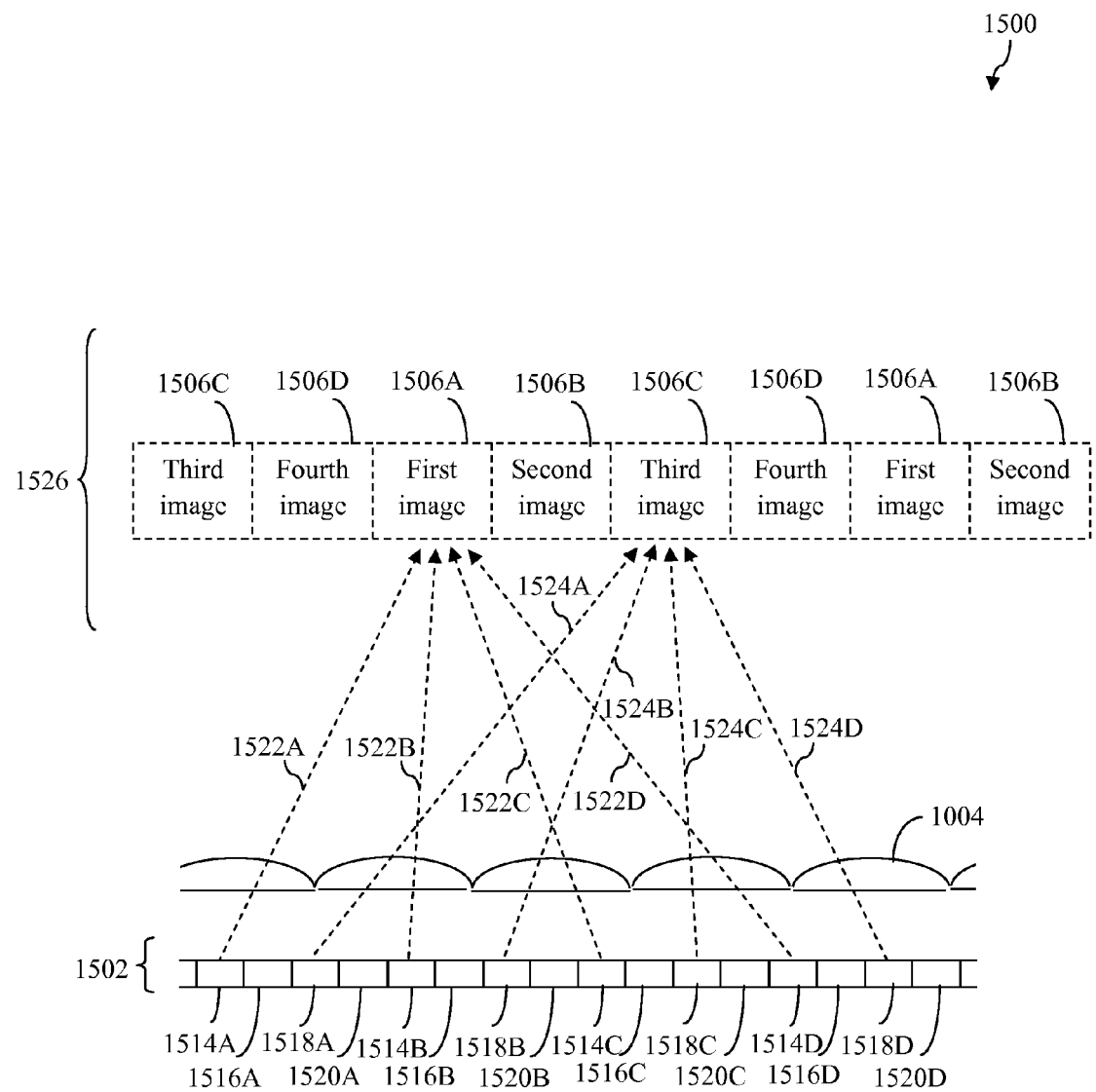
FIG. 15 depicts a cross-sectional view of a display system shown in FIG. 2 that provides multiple three-dimensional images according to an example embodiment.

In a further embodiment, display system 1000 may be configured to generate multiple three-dimensional images for viewing by users in a viewing space. Each of the three-dimensional images may correspond to a pair of images generated by sets of pixels of pixel array 1024. Elastic light manipulator 1004 manipulates light from pixel array 1024 to form the image pairs in a viewing space to be perceived by users as three-dimensional images. For instance, FIG. 15 depicts a cross-sectional view of a display system 1500 that provides multiple three-dimensional images according to an example embodiment. As shown in FIG. 15, system 1500 includes a pixel array 1502 and an elastic light manipulator 1004. System 1500 may also include display controller 202 of FIG. 2, which is not shown in FIG. 15 for ease of illustration. System 1500 is described as follows.

In the example of FIG. 15, pixel array 1502 includes a first set of pixels 1514A-1514D, a second set of pixels 1516A-1516D, a third set of pixels 1518A-1518D, and a fourth set of pixels 1520A-1520D. Each set of pixels generates a corresponding image. First set of pixels 1514A-1514D and third set of pixels 1518A-1518D are configured to generate images that combine to form a first three-dimensional image. Second set of pixels 1516A-1516D and fourth set of pixels 1520A-1520D are configured to generate images that combine to form a second three-dimensional image. Pixels of the four sets of pixels are alternated in pixel array 1502 in the order of pixel 1514A, pixel 1516A, pixel 1518A, pixel 1520A, pixel 1514B, pixel 1516B, etc. Further pixels may be included in each set of pixels in pixel array 1502 that are not visible in FIG. 15, including hundreds, thousands, or millions of pixels in each set of pixels. Each of pixels 1514A-1514D, pixels 1516A-1516D, pixels 1518A-1518D, and pixels 1520A-1520D generates light, which emanates from the surface of pixel array 1502 toward elastic light manipulator 1004.

As shown in FIG. 15, light emanating from pixel array 1502 is manipulated by elastic light manipulator 1004 to form a plurality of images in a viewing space 1526. For instance, four images are formed in viewing space 1526, including first-fourth images 1506A-1506D. Pixels 1514A-1514D correspond to first image 1506A, pixels 1516A-1516D correspond to second image 1506B, pixels 1518A-1518D correspond to third image 1506C, and pixels 1520A-1520D correspond to fourth image 1506D. As shown in FIG. 15, light 1522A-1522D from the first set of pixels 1514A-1514D forms first image 1506A, and light 1524A-1524D from the third set of pixels 1518A-1518D forms third image 1506C, due to the optical characteristics of elastic light manipulator 1004 that are associated with elastic light manipulator 1004 being stretched to a specified length. Although not shown in FIG. 15 (for ease of illustration), in a similar fashion, light from the second set of pixels 1516A-1516D forms second image 1506B, and light from the fourth set of pixels 1520A-1520D forms fourth image 1506D.

It is noted that multiple instances of each of first-fourth images 1506A-1508D may be formed in viewing space 1526 in a repeating fashion due to the optical characteristics of elastic light manipulator 1004. As shown in FIG. 15, a first instance of third image 1506C is next to a first instance of fourth image 1506D, which is next to a first instance of first image 1506A, followed by a first instance of second image 1506D, followed by a second instance of third image 1506C, followed by a second instance of fourth image 1506D, followed by a second instance of first image 1506A, followed by a second instance of second image 1506B. Each instance of first-fourth images 1506A-1508D is generated by light emanating from first-fourth sets of pixels 1514A-1514D, 1516A-1516D, 1518A-1518D, and 1520A-1520D, respectively. Further instances of first-fourth images 1506A-1506D may repeat in viewing space 1526 in a similar fashion, but are not shown in FIG. 15 for ease of illustration.

In the embodiment of FIG. 15, any pair of images 1506A-1506D may be configured to be perceived as a three-dimensional image by a user in viewing space 1526 (similarly to user 1404 in FIG. 14). For instance, first and third images 1506A and 1506C may be configured to be perceived by a user as a first three-dimensional image, such that first image 1506A is received at a first eye location and third image 1506C is received at a second eye location of a first user. Furthermore, second and fourth images 1506B and 1506D may be configured to be perceived by a second user as a second three-dimensional image, such that second image 1506B is received at a first eye location and fourth image 1506D is received at a second eye location of the second user. Furthermore, the additional instances of the pair of first and third images 1506A and 1506C, and of the pair of second and fourth images 1506B and 1506D may be perceived as the first and second three-dimensional images by further users in viewing space 1526.

In the example of FIG. 15, two three-dimensional images are provided by system 1500. In further embodiments, further numbers of three-dimensional images may be provided, including three three-dimensional images, four three-dimensional images, etc. In such case, each three-dimensional image is generated by manipulating light (using an elastic light manipulator) corresponding to an image pair generated by a corresponding pair of sets of pixels of the pixel array, in a similar fashion as described with respect to FIG. 15 for two three-dimensional images.

D. Example Stretching Device Embodiments

Figure 16:
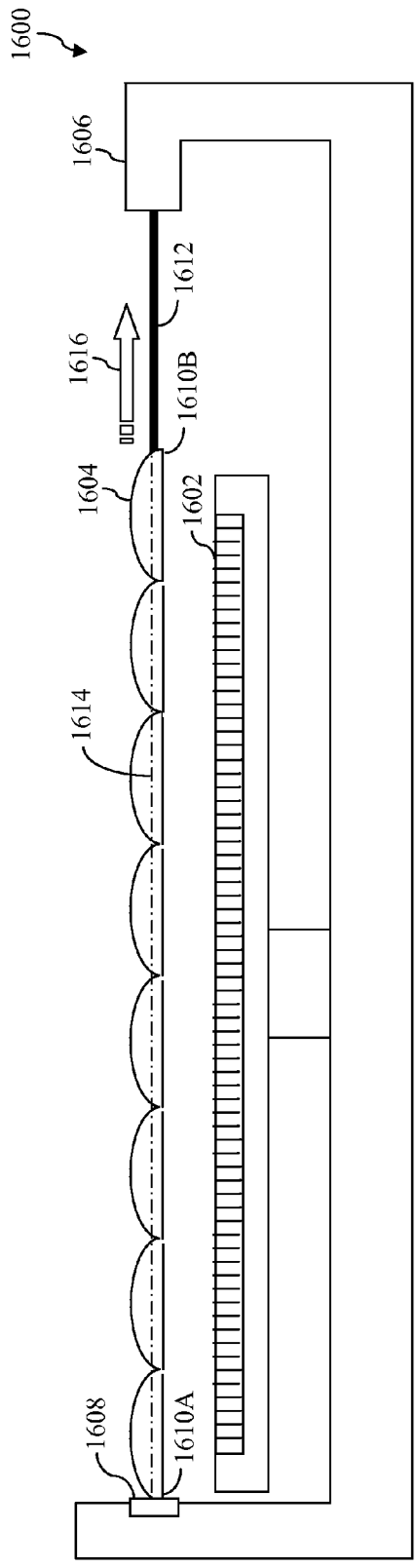
FIGS. 16 and 17 depict cross-sectional views of example implementations of a display system shown in FIG. 2 that include stretching devices according to embodiments.
Figure 17:
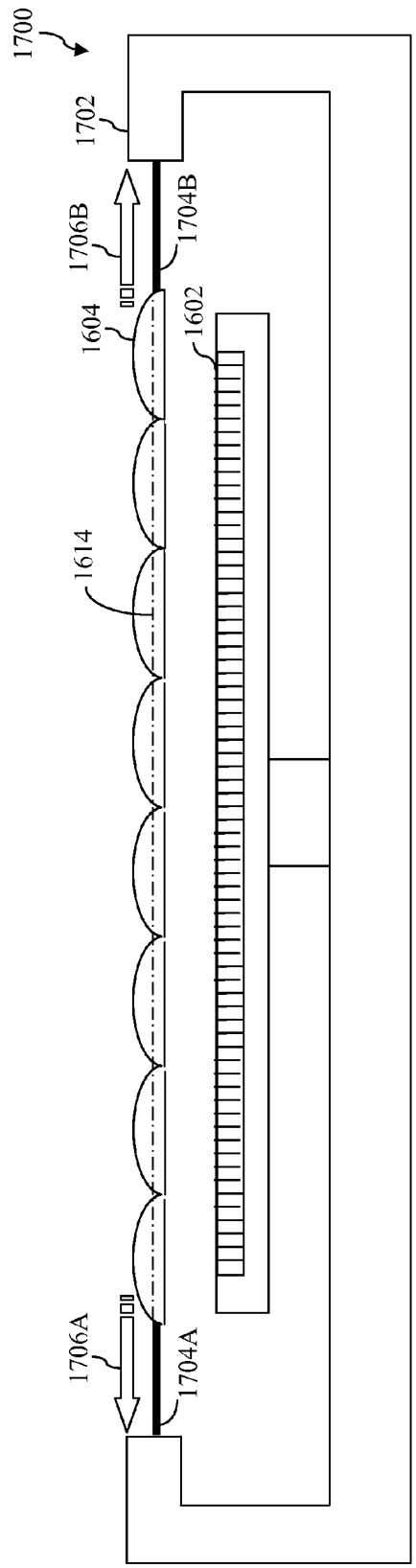

As described above, an elastic light manipulator may be stretched to change optical characteristics of the elastic light manipulator for providing two-dimensional and/or three-dimensional images. FIGS. 16 and 17 depict cross-sectional views of example implementations of a display system shown in FIG. 2 that include stretching devices according to embodiments. As shown in FIG. 16, display system 1600 includes an elastic light manipulator 1604 that is placed proximate to a surface of pixel array 1602. Elastic light manipulator 1604 is shown to be implemented as an elastic lenticular lens for illustrative purposes and is not intended to be limiting. Elastic light manipulator 1604 may be any suitable type of elastic light manipulator.

A stretching device 1606 is configured to stretch elastic light manipulator 1604 along an axis 1614. Stretching device 1606 includes a securing element 1608 and a pulling element 1612. Securing element 1608 secures a first edge 1610A of elastic light manipulator 1604. For instance, securing element 1608 may be configured to maintain first edge 1610A of elastic light manipulator 1604 in a fixed position with respect to pixel array 1602 as elastic light manipulator 1604 is stretched. Pulling element 1612 is configured to pull a second edge 1610B of elastic light manipulator 1604 that opposes the first edge 1610A in a direction away from securing element 1608, as indicated by arrow 1616. For instance, pulling element 1612 may apply a tensile stress at second edge 1610B to pull second edge 1610B, such that an extent to which elastic light manipulator 1604 is stretched is based on a magnitude of the tensile stress. Accordingly, pulling element 1612 stretches elastic light manipulator 1604 along axis 1614.

As shown in FIG. 17, display system 1700 includes elastic light manipulator 1604 and pixel array 1602 as described above with reference to FIG. 16. Display system 1700 further includes a stretching device 1702 that is configured to stretch elastic light manipulator 1604 along an axis 1614. Stretching device 1702 includes first and second pulling elements 1704A and 1704B. Pulling elements 1704A and 1704B are configured to pull opposing edges of elastic light manipulator 1604 to stretch elastic light manipulator 1604 along axis 1614. For example, pulling element 1704A is shown in FIG. 17 to be coupled to a left edge of elastic light manipulator 1604, and pulling element 1704B is shown to be coupled to a right edge of elastic light manipulator 1604. Pulling element 1704A is configured to pull the left edge of elastic light manipulator 1604 toward the left, and pulling element 1704B is configured to pull the right edge of elastic light manipulator 1604 toward the right, to stretch elastic light manipulator 1604 along axis 1614.

Stretching devices 1606 and 1702 are described as being configured to stretch elastic light manipulator 1604 along axis 1614 for illustrative purposes and are not intended to be limiting. It will be recognized that stretching device 1606 and/or stretching device 1702 may be configured to stretch elastic light manipulator 1604 along one or more other axes in addition to or in lieu of axis 1614. For instance, stretching device 1606 and/or stretching device 1702 may stretch elastic light manipulator 1604 along an axis that is perpendicular to axis 1614 in addition to or in lieu of stretching elastic light manipulator 1604 along axis 1614. For example, the axis that is perpendicular to axis 1614 may extend into or out of FIG. 16 or FIG. 17.

Any of a variety of other devices may be used in addition to or in lieu of a stretching device to change a mechanical orientation of an elastic light manipulator (e.g., elastic light manipulator 1604) for providing two-dimensional and/or three-dimensional images. For instance, such devices may be used to accommodate a moving user based on an indicator that specifies a location of the user's head. For example, a curvature device may be used to change a curvature of elastic light manipulator 104, an orientation device may be used to change an angle at which elastic light manipulator 104 is mounted with respect to a pixel array (e.g., pixel array 1602), etc.

E. Example Retracting Device Embodiments

Figure 18:
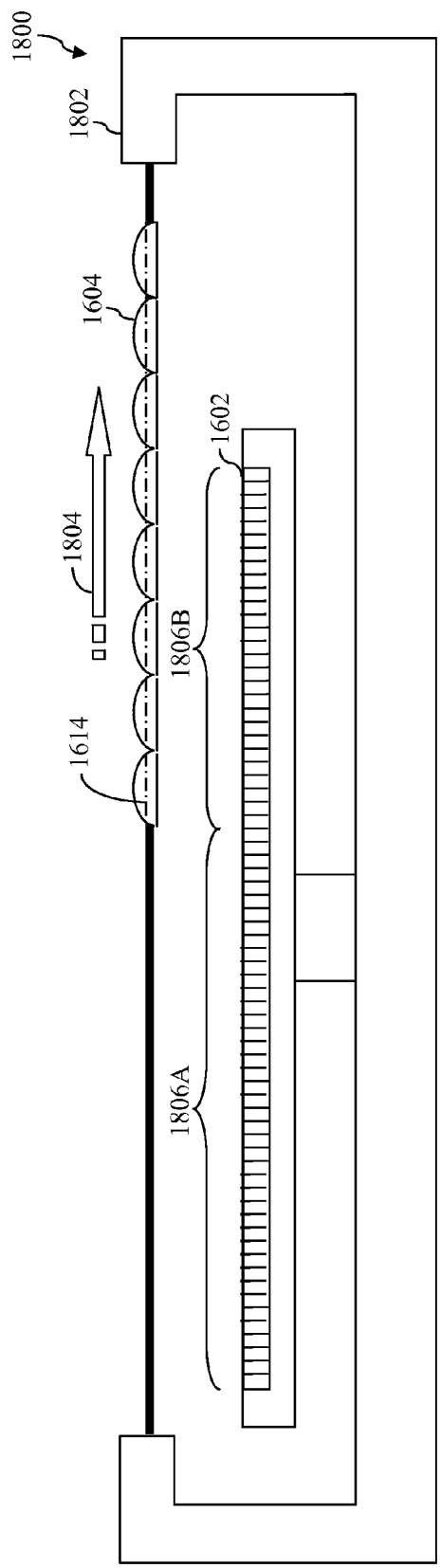
FIG. 18 depicts a cross-sectional view of an example implementation of a display system shown in FIG. 2 that includes a retraction device according to an embodiment.

It may be desirable to retract an elastic light manipulator to provide an unobstructed view of a pixel array (or a portion thereof), for example. FIG. 18 depicts a cross-sectional view of an example implementation of a display system shown in FIG. 2 that includes a retraction device according to an embodiment. As shown in FIG. 18, display system 1800 includes elastic light manipulator 1604 and pixel array 1602 as described above with reference to FIG. 16. Display system 1800 further includes a retraction device 1802 that is configured to move elastic light manipulator 1604 along axis 1614. For example, retraction device 1802 is shown in FIG. 18 to move elastic light manipulator toward the right, as indicated by arrow 1804, for illustrative purposes. In accordance with this example, pixels 1806A of pixel array 1602 may not be covered by elastic light manipulator 1604 from the perspective of a user, and pixels 1806B of pixel array 1602 may be covered by elastic light manipulator 1604 from the perspective of the user. For instance, pixels 1806A may be configured to provide a two-dimensional image to the user, and pixels 1806B may be configured to provide a three-dimensional image to the user.

Retraction device 1802 is described as being configured to move elastic light manipulator 1604 along axis 1614 for illustrative purposes and is not intended to be limiting. It will be recognized that retraction device 1802 may be configured to move elastic light manipulator 1604 along one or more other axes in addition to or in lieu of axis 1614. For instance, retraction device 1802 may move elastic light manipulator 1604 along an axis that is perpendicular to axis 1614 in addition to or in lieu of moving elastic light manipulator 1604 along axis 1614. For example, the axis that is perpendicular to axis 1614 may extend into or out of FIG. 18.

F. Example Rolling Device Embodiments

Figure 19:
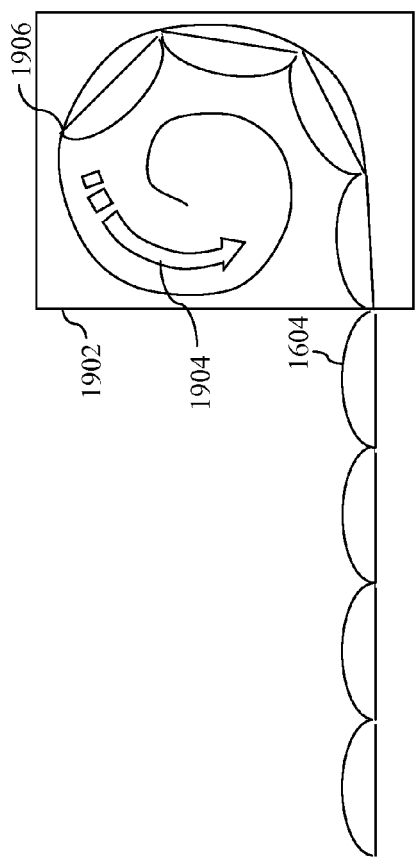
FIG. 19 depicts a cross-sectional view of an example implementation of a rolling device according to an embodiment.

FIG. 19 depicts a cross-sectional view of an example implementation of a rolling device 1902 according to an embodiment. Rolling device 1902 is configured to roll an elastic light manipulator (e.g., elastic light manipulator 1604) into a rolled state as indicated by arrow 1904. For instance, rolling device 1902 may be configured to pull an edge 1906 of elastic light manipulator 1604 in a direction indicated by arrow 1904. For example, rolling elastic light manipulator 1604 may stretch elastic light manipulator 1604, thereby changing optical properties of elastic light manipulator 1604. In accordance with this example, rolling device 1902 may be included in a stretching device, such as stretching device 1606 of FIG. 16 or stretching device 1702 of FIG. 17. In another example, rolling device 1902 may be configured to move elastic light manipulator 1604 (or a portion thereof) from a position between a pixel array and a user. In accordance with this example, rolling device 1902 may be included in a retraction device, such as retraction device 1802 of FIG. 18. It will be recognized that one rolling device may be coupled to a single edge of an elastic light manipulator, as shown in FIG. 19. Alternatively, multiple rolling devices may be coupled to respective opposing edges of an elastic light manipulator.

Any one or more of example stretching device 1606 of FIG. 16, example stretching device 1702 of FIG. 17, example retraction device 1802 of FIG. 18, example rolling device 1902 of FIG. 19, and/or other devices that may be used to change the mechanical orientation of an elastic light manipulator may be included in manipulator controller 206 of FIG. 2. For example, stretching device 1606, stretching device 1702, retraction device 1802, rolling device 1902, and/or other devices may be implemented using a motor, such as a stepper motor. In accordance with this example, manipulator controller 206 may generate control signals for controlling the motor based on indicators that specify locations of users' heads in a viewing space (e.g., viewing space 106).

It will be recognized that example stretching devices 1606 and 1702, example retraction device 1802, and example rolling device 1902 are provided for illustrative purposes and are not intended to be limiting. Any suitable stretching device, retraction device, and/or rolling device may be used to respectively stretch, retract, and/or roll an elastic light manipulator.

III. Example Display Controller Implementations

Display controller 202, pixel array controller 204, and manipulator controller 206 may be implemented in hardware, software, firmware, or any combination thereof For example, display controller 202, pixel array controller 204, and/or manipulator controller 206 may be implemented as computer program code configured to be executed in one or more processors. Alternatively, display controller 202, pixel array controller 204, and/or manipulator controller 206 may be implemented as hardware logic/electrical circuitry.

Figure 20:
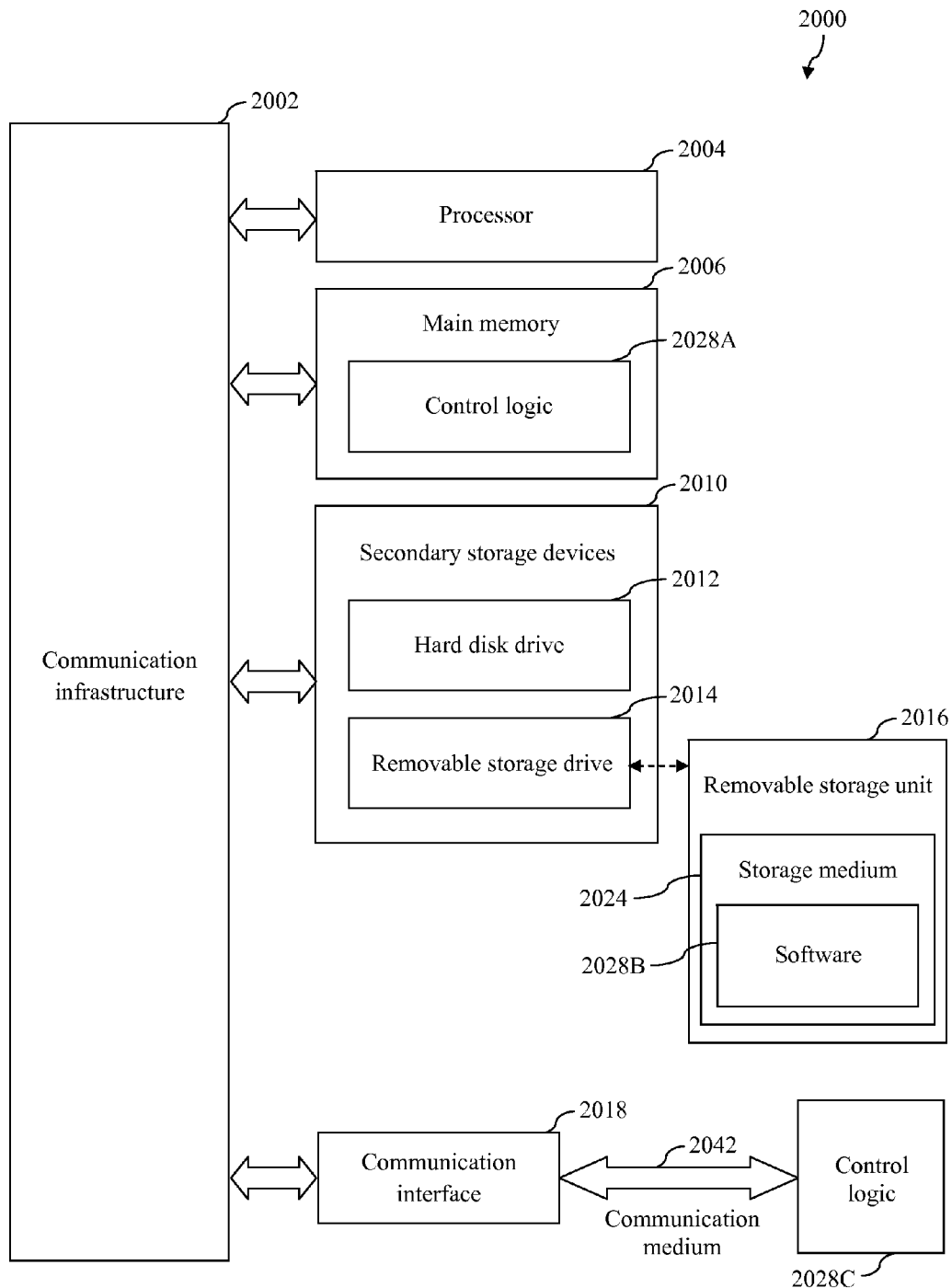
FIG. 20 shows a block diagram of an example computer system in which embodiments may be implemented.

For instance, FIG. 20 shows a block diagram of an example implementation of display controller 202, according to an embodiment. In embodiments, display controller 202 may include one or more of the elements shown in FIG. 20. As shown in the example of FIG. 20, display controller 202 may include one or more processors (also called central processing units, or CPUs), such as a processor 2004. Processor 2004 is connected to a communication infrastructure 2002, such as a communication bus. In some embodiments, processor 2004 can simultaneously operate multiple computing threads.

Display controller 202 also includes a primary or main memory 2006, such as random access memory (RAM). Main memory 2006 has stored therein control logic 2028A (computer software), and data.

Display controller 202 also includes one or more secondary storage devices 2010. Secondary storage devices 2010 include, for example, a hard disk drive 2012 and/or a removable storage device or drive 2014, as well as other types of storage devices, such as memory cards and memory sticks. For instance, display controller 202 may include an industry standard interface, such a universal serial bus (USB) interface for interfacing with devices such as a memory stick. Removable storage drive 2014 represents a floppy disk drive, a magnetic tape drive, a compact disk drive, an optical storage device, tape backup, etc.

Removable storage drive 2014 interacts with a removable storage unit 2016. Removable storage unit 2016 includes a computer useable or readable storage medium 2024 having stored therein computer software 2028B (control logic) and/or data. Removable storage unit 2016 represents a floppy disk, magnetic tape, compact disk, DVD, optical storage disk, or any other computer data storage device. Removable storage drive 2014 reads from and/or writes to removable storage unit 2016 in a well known manner.

Display controller 202 further includes a communication or network interface 2018. Communication interface 2018 enables the display controller 202 to communicate with remote devices. For example, communication interface 2018 allows display controller 202 to communicate over communication networks or mediums 2042 (representing a form of a computer useable or readable medium), such as LANs, WANs, the Internet, etc. Network interface 2018 may interface with remote sites or networks via wired or wireless connections.

Control logic 2028C may be transmitted to and from display controller 202 via the communication medium 2042.

Any apparatus or manufacture comprising a computer useable or readable medium having control logic (software) stored therein is referred to herein as a computer program product or program storage device. This includes, but is not limited to, display controller 202, main memory 2006, secondary storage devices 2010, and removable storage unit 2016. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for display controller 202, pixel array controller 204, and/or manipulator controller 206, flowchart 900 (including any one or more steps of flowchart 900), and/or flowchart 1100 (including any one or more steps of flowchart 1100), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can be put into practice using software, hardware, and/or operating system implementations other than those described herein. Any software, hardware, and operating system implementations suitable for performing the functions described herein can be used.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A display system that delivers a first image to a first location and a second image to a second location, the display system comprising:

an array of pixels configured to emit light; and an elastic light manipulator configured to receive and manipulate the light emitted by the array of pixels to form different images at different locations, the elastic light manipulator having a first length and being configured to be stretched from the first length to a selectable second length by applying a tensile stress to the elastic light manipulator to form the first image at the first location and the second image at the second location.

2. The display system of claim 1, wherein the elastic light manipulator comprises:

an array of elastic sub-lenses.

3. The display system of claim 1, wherein the elastic light manipulator comprises:

a plurality of parallax barrier elements.

4. The display system of claim 1, wherein the first location corresponds to a location of a right eye of a user;

wherein the second location corresponds to a location of a left eye of the user; and wherein the first and second images are configured to be perceived by the user as a three-dimensional image.

5. The display system of claim 4, wherein the elastic light manipulator is configured to be stretched from the first length to the selectable second length to further form a third image to a third location and a fourth image to a fourth location;

wherein the third location corresponds to a location of a right eye of a second user;

wherein the fourth location corresponds to a location of a left eye of the second user; and wherein the third and fourth images are configured to be perceived by the second user as a three-dimensional image.

6. The display system of claim 4, wherein light emitted by a portion of the array of pixels is not blocked by the elastic light manipulator, the light emitted by the portion of the array of pixels forming a two-dimensional image at the first and second locations, the portion including a subset of pixels in the array of pixels.

7. The display system of claim 1, wherein the first location corresponds to a location of a right eye of a user;

wherein the second location corresponds to a location of a left eye of the user; and wherein the first and second images are configured to be perceived by the user as a two-dimensional image.

8. The display system of claim 1, wherein the elastic light manipulator is configured to be stretched from the first length to the selectable second length to form the first and second images at a first distance from the array of pixels; and wherein the elastic light manipulator is further configured to be stretched from the first length to a selectable third length to form the first and second images at a second distance from the array of pixels that is different from the first distance.

9. The display system of claim 1, further comprising:

a stretching device that includes a stretching element coupled to a side of the elastic light manipulator, the stretching element configured to stretch the elastic light manipulator from the first length to the selectable second length.

10. The display system of claim 1, further comprising:

a stretching device that includes stretching elements coupled to opposing sides of the elastic light manipulator, the stretching elements configured to stretch the elastic light manipulator from the first length to the selectable second length.

11. The display system of claim 1, further comprising:

a retraction device configured to retract the elastic light manipulator from a position that is between the array of pixels and a user to enable the user to view a two-dimensional image with respect to the array of pixels.

12. The display system of claim 11, wherein the retraction device is configured to retract the elastic light manipulator to a rolled state.

13. The display system of claim 1, further comprising:

a module configured to change data that are associated with the array of pixels to enable the elastic light manipulator to form the first image at the first location.

14. The display system of claim 1, wherein the elastic light manipulator has a first width that is perpendicular to the first length; and wherein the elastic light manipulator is configured to be stretched from the first length to the selectable second length and from the first width to a selectable second width to form the first image to the first location and the second image to the second location.

15. A display system that provides a first image to a first location and a second image to a second location, the display system comprising:

an array of pixels configured to emit light; and a lenticular lens comprising an array of elastic sub-lenses that is configured to receive and manipulate the light emitted by the array of pixels to form different images at different locations, the lenticular lens having a first length, and the lenticular lens configured to be stretched from the first length to a selectable second length by applying a tensile stress to the lenticular lens to form the first image to the first location and the second image at the second location.

16. The display system of claim 15, wherein the first location corresponds to a location of a right eye of a user;

wherein the second location corresponds to a location of a left eye of the user; and wherein the first and second images are configured to be perceived by the user as a three-dimensional image.

17. The display system of claim 16, wherein the lenticular lens is configured to be stretched from the first length to the selectable second length to further form a third image to a third location and a fourth image to a fourth location;

wherein the third location corresponds to a location of a right eye of a second user;

wherein the fourth location corresponds to a location of a left eye of the second user; and wherein the third and fourth images are configured to be perceived by the second user as a three-dimensional image.

18. The display system of claim 15, further comprising:

a stretching device that includes a stretching element coupled to a side of the lenticular lens, the stretching element configured to stretch the lenticular lens across the array of pixels.

19. The display system of claim 15, further comprising:

a stretching device that includes stretching elements coupled to opposing sides of the lenticular lens, the stretching elements configured to stretch the lenticular lens across the array of pixels.

20. The display system of claim 15, further comprising:

a retraction device configured to retract the lenticular lens from a position that is between the array of pixels and a user to enable the user to view a two-dimensional image with respect to the array of pixels.

21. The display system of claim 20, wherein the retraction device is configured to retract the lenticular lens to a rolled state.

22. A method of forming a first image to a first location and a second image to a second location, comprising: p1 stretching an elastic light manipulator from a first length to a selectable second length by applying tensile stress to the elastic light manipulator;
receiving light emitted by an array of pixels at the elastic light manipulator; and
manipulating the light emitted by the array of pixels by the elastic light manipulator to form the first image at the first location and the second image at the second location.

23. The method of claim 22, wherein stretching the elastic light manipulator comprises:
stretching an elastic light manipulator that includes an array of elastic sub-lenses from the first length to the selectable second length.

24. The method of claim 22, wherein stretching the elastic light manipulator comprises:
stretching an elastic light manipulator that includes a plurality of parallax barrier elements from the first length to the selectable second length.

25. The method of claim 22, wherein manipulating the light emitted by the array of pixels to form the first image at the first location and the second image at the second location comprises:
manipulating the light emitted by the array of pixels to form the first image at the first location that corresponds to a location of a right eye of a user and to provide the second image at the second location that corresponds to a location of a left eye of the user, the first and second images being configured to be perceived by the user as a three-dimensional image.

26. The method of claim 25, further comprising:
manipulating the light emitted by the array of pixels by the elastic light manipulator to further form a third image to a third location that corresponds to a location of a right eye of a second user and to form a fourth image to a fourth location that corresponds to a location of a left eye of the second user, the third and fourth images being configured to be perceived by the second user as a three-dimensional image.

27. The method of claim 25, further comprising:
passing b the elastic light manipulator light emitted by a subset of pixels in the array of pixels to form a two-dimensional image at the first and second locations.

28. The method of claim 22, wherein stretching the elastic light manipulator comprises:
securing a first edge of the elastic light manipulator; and
pulling a second edge of the elastic light manipulator that opposes the first edge to stretch the elastic light manipulator from the first length to the selectable second length.

29. The method of claim 22, wherein stretching the elastic light manipulator comprises:
pulling opposing sides of the elastic light manipulator to stretch the elastic light manipulator from the first length to the selectable second length.

30. The method of claim 22, further comprising:
retracting the elastic light manipulator from a position that is between the array of pixels and a user to enable the user to view a two-dimensional image with respect to the array of pixels.

31. The method of claim 30, wherein retracting the elastic light manipulator comprises:
retracting the elastic light manipulator to a rolled state.

32. The method of claim 22, wherein stretching the elastic light manipulator comprises:
stretching the elastic light manipulator from the first length to the selectable second length and from a first width to a selectable second width
wherein the first length is perpendicular to the first width.

* * * * *

UNITED STATES PATENT AND TRADEMARK OFFICE
CERTIFICATE OF CORRECTION

PATENT NO. : 8,964,013 B2  
APPLICATION NO. : 12/774307  
DATED : February 24, 2015  
INVENTOR(S) : James D. Bennett et al.

Page 1 of 1

It is certified that error appears in the above-identified patent and that said Letters Patent is hereby corrected as shown below:

In the Claims

In column 17, line 26, in claim 5, delete "image to" and insert -- image at --, therefor.

In column 17, line 27, in claim 5, delete "image to" and insert -- image at --, therefor.

In column 18, line 20, in claim 14, delete "image to the" and insert -- image at the --, therefor.

In column 18, line 21, in claim 14, delete "image to" and insert -- image at --, therefor.

In column 18, line 22, in claim 15, delete "provides" and insert -- forms --, therefor.

In column 18, line 22, in claim 15, delete "image to" and insert -- image at --, therefor.

In column 18, line 23, in claim 15, delete "image to" and insert -- image at --, therefor.

In column 18, line 33, in claim 15, delete "image to" and insert -- image at --, therefor.

In column 18, line 44, in claim 17, delete "image to" and insert -- image at --, therefor.

In column 18, line 45, in claim 17, delete "image to" and insert -- image at --, therefor.

In column 19, line 4, in claim 22, delete "image to" and insert -- image at --, therefor.

In column 19, line 5, in claim 22, delete "image to" and insert -- image at --, therefor.

In column 19, line 5, in claim 22, after "comprising:" delete "p1".

In column 19, line 31, in claim 25, delete "provide" and insert -- form --, therefor.

In column 19, line 38, in claim 26, delete "image to" and insert -- image at --, therefor.

In column 20, line 2, in claim 26, delete "image to" and insert -- image at --, therefor.

In column 20, line 8, in claim 27, delete "passing b" and insert -- passing by --, therefor.

In column 20, line 36, in claim 32, delete "width" and insert -- width; --.

Signed and Sealed this  
Seventh Day of July, 2015

Michelle K. Lee  
*Director of the United States Patent and Trademark Office*